United States Patent [19]

Hirao et al.

[11] Patent Number: 5,800,950
[45] Date of Patent: Sep. 1, 1998

[54] RECORDING MEDIUM

[75] Inventors: Akiko Hirao, Chiba; Hirohisa Miyamoto, Kawasaki; Hideyuki Nishizawa, Tokyo; Masahiro Hosoya, Okegawa; Masami Sugiuchi, Yokohama, all of Japan

[73] Assignee: Kabushiki Kaisha Toshiba, Kawasaki, Japan

[21] Appl. No.: 615,687

[22] Filed: Mar. 13, 1996

[30] Foreign Application Priority Data

Mar. 16, 1995 [JP] Japan ................. 7-056881
May 1, 1995 [JP] Japan ................. 7-107504
Mar. 12, 1996 [JP] Japan ................. 8-055031

[51] Int. Cl.$^6$ ................. H01L 23/00
[52] U.S. Cl. ................. 430/1; 430/2; 430/290; 430/270.15; 430/270.11; 359/3; 365/124
[58] Field of Search ................. 430/2, 1, 290; 359/1, 2, 3; 365/106, 124

[56] References Cited

U.S. PATENT DOCUMENTS

| | | | |
|---|---|---|---|
| 4,999,809 | 3/1991 | Schildkraut et al. | 365/124 |
| 5,064,264 | 11/1991 | Ducharme et al. | 385/130 |
| 5,115,336 | 5/1992 | Schildkraut et al. | 359/263 |
| 5,184,323 | 2/1993 | Schildkraut et al. | 365/124 |
| 5,361,148 | 11/1994 | Bjorklund et al. | 359/4 |
| 5,543,251 | 8/1996 | Taylor | 430/2 |
| 5,569,565 | 10/1996 | Kawakami et al. | 430/1 |
| 5,607,799 | 3/1997 | Moerner et al. | 430/1 |

OTHER PUBLICATIONS

W.E. Moerner, et al. "Polymeric Photorefractive Materials", *Chemistry Review*, 1994, 94, pp. 127–155.

Akiko Hirao, et al. "Diffusion and Drift of Carriers in Molecularly Doped Polymers", *Physical Review Letters*, vol. 75, No. 9, Aug. 28, 1995, pp. 1787–1790.

Sandalphon et al., Opt. Lett., vol. 19(1) pp. 68–70, Jan. 1994.

Stankus et al., Opt. Lett., vol. 19(18) pp. 1480–1482 Sep. 1994.

Moerner et al., Josa B., vol. 11(2) pp. 320–330, Feb. 1994.

"Handbook or Optics", vol. II., Bass, M., Ed in Chief, 1995.

*Primary Examiner*—Martin Angebranndt
*Attorney, Agent, or Firm*—Oblon, Spivak, McClelland, Maier & Neustadt, P.C.

[57] ABSTRACT

A recording element which comprises a recording layer containing, a first charge-generating material adapted to generate a first electric charge by a supply of external energy, a first charge-transporting material for transporting the first electric charge, a charge-capturing material for capturing the first electric charge, and a material having an electro-optical effect, wherein a change in optical properties of the recording layer is caused only through an inner electric field to be generated by a delivery of electric charge between the first charge-generating material generating electric charge and the charge-capturing material capturing the electric charge.

22 Claims, 5 Drawing Sheets

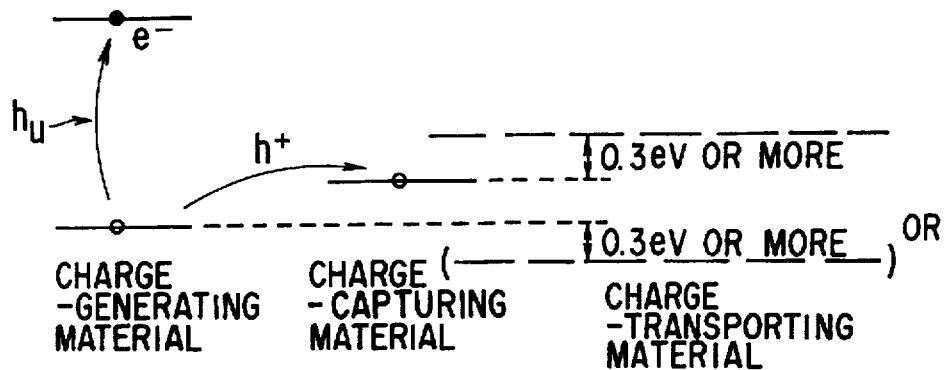
F I G. 3A
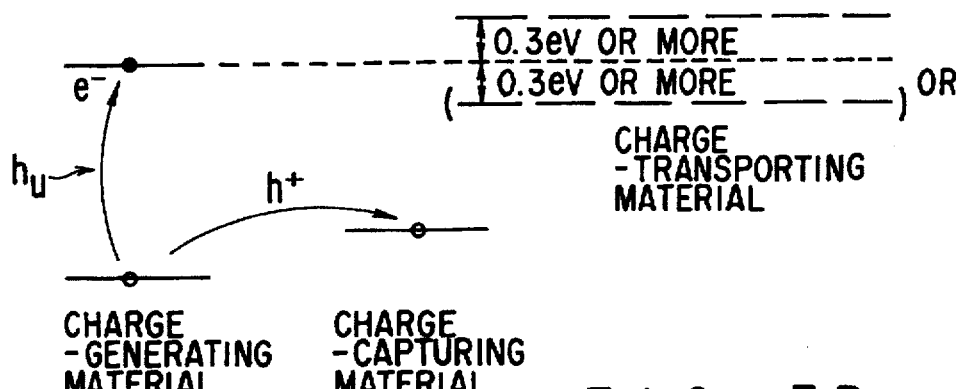
F I G. 3B
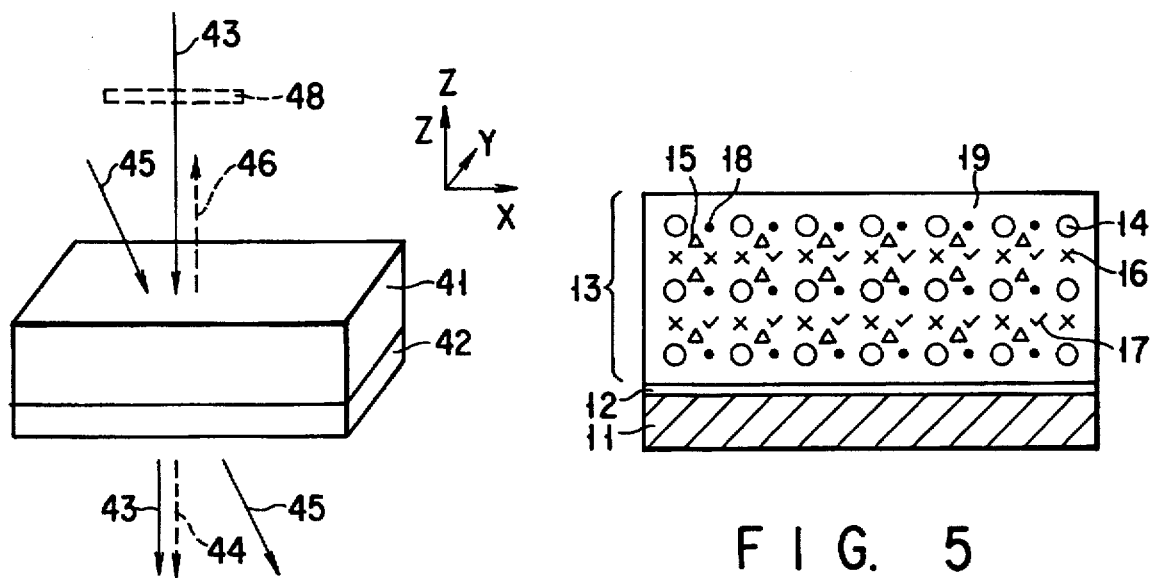
F I G. 4
F I G. 5

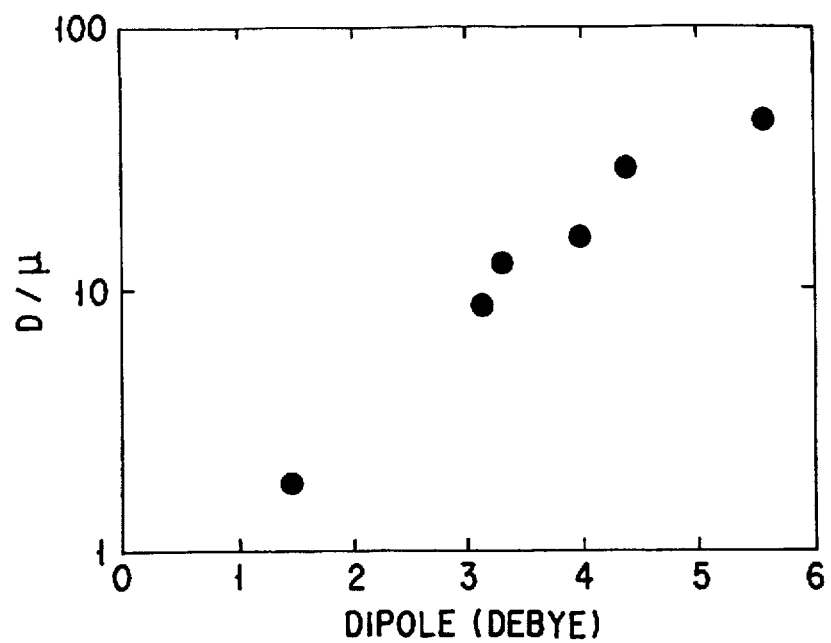
F I G. 6
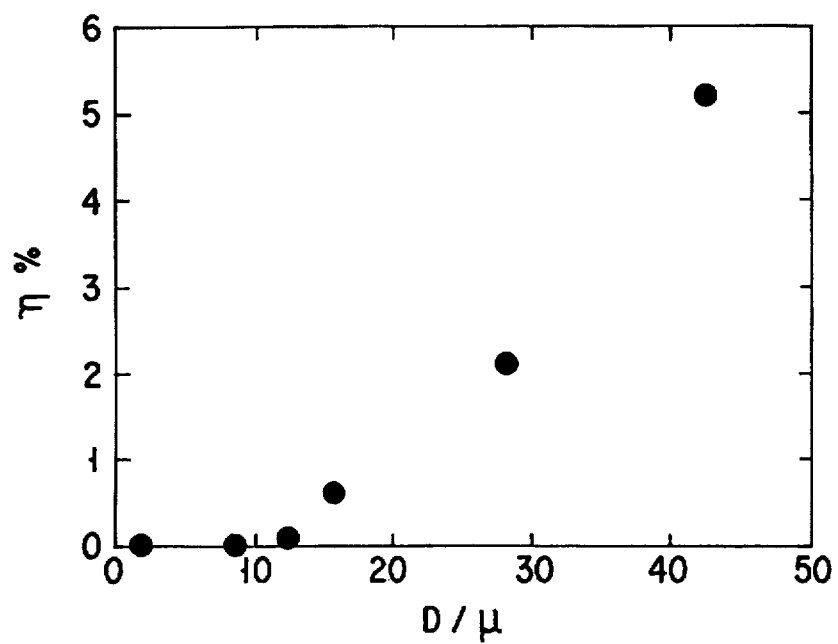
F I G. 7

RECORDING MEDIUM

BACKGROUND OF THE INVENTION

1. Field of the Invention

This invention relates to a recording element having a recording layer in which an inner electric field is adapted to be formed.

2. Description of the Related Art

A photorefractive medium is known as one of optical recording media which is capable of recording an information at an extremely higher density as compared with the conventional photoelectro-magnetic recording medium or the conventional photo-thermal phase-change type recording medium (optical disk). According to this photorefractive medium, it is possible to record a data of large capacity such as a high-density image through the changes in refractive index of the recording layer which can be effected through the following mechanism. Namely, when the recording layer is irradiated by an electromagnetic wave, the electric charge in the interior of the recording layer is spatially isolated, thus generating an electric field, which in turn causes the refractive index of the recording layer to change. Therefore, it is possible, by increasing the electric field to be generated in the photorefractive medium, to further increase the change in refractive index through Pockels effect. Since it is possible with this photorefractive medium to directly record the interference pattern of an electromagnetic wave, the photorefractive medium is expected to be also applicable to a holographic memory, a photoarithmetic element, etc.

As for the material for this photorefractive medium, various inorganic materials have been studied. However, in view of easiness in the manufacture of crystalline material or in the control of characteristics, the use of an organic material for the manufacture of photorefractive medium has been developed recently (Japanese Patent Publication No. H6-55901). On the other hand, photorefractive polymer itself is disclosed in Japanese Patent Unexamined Publication Nos. H6-235949, H6-235809, H5-281498 and H6-175167.

This photorefractive medium is employed in such a way that a recording layer 2 constituted by a photorefractive medium is superimposed on its both surfaces with transparent electrodes 1 and 3 as shown in FIG. 1 and an electric field is applied thereto from outside. In the photorefractive medium shown in FIG. 1, the writing of an information is performed such that laser beams separated into two, i.e. an object beam 4 and a reference beam 5 are irradiated onto the photorefractive medium so as to intersect with each other on the photorefractive medium to form a diffraction pattern of laser beams thereby writing the information. The reproduction of an information written in the photorefractive medium can be performed by irradiating a reference beam 5 as in the case of the writing while intercepting the object beam 4, and by reading a resultant regenerated beam 6.

The reasons why the conventional recording medium requires an external electric field will be explained in detail below.

When an interference pattern of electromagnetic wave is irradiated onto the photorefractive medium, non-equilibrium carrier is generated in the photorefractive medium in relation to the magnitude of the electromagnetic wave. In this case, when an external electric field $E_{ex}$ is applied to the photorefractive medium in such a manner as to become parallel with the wave vector of the electromagnetic wave, an electric field E is generated as represented by the following formula (1).

$$E = E_0[(1+iE_{ex}/E_d)/\{1+iE_{ex}/(E_d+E_q)\}](I_1+I_0) \quad (1)$$

$$E_0 = iE_d/(1+E_d/E_q) \quad (2)$$

$$E_d = (2\pi D)/(\mu\Lambda) \quad (3)$$

$$E_q = (eN\Lambda)/(2\pi\epsilon) \quad (4)$$

where $I_0$ is a spatial average of an irradiated light intensity, $I_1$ is a difference between the maximal value and the minimal value of an irradiated light intensity, $\Lambda$ is a spatial waveguide or periodicity (a distance between the maximal values of the nearest proximity), $\epsilon$ is a dielectric constant of a photorefractive medium, N is a density of spatial charge, D is a diffusion coefficient, $\mu$ is a mobility, e represents an amount of elemental electric charge, and i is an imaginary unit representing a phase (for example, Pochi Yeh, Introduction to Photorefractive Nonlinear Optics, chapter 3, John Wiley & Sons Co., March 1993).

Physically speaking, $E_d$ represents an electric field generated by the diffusion of electric charge, and $E_q$ represents a spatial electric field generated by ionized impurities and immobilized electric charge. Generally, the relationship between the diffusion coefficient "D" and the mobility "$\mu$" is assumed to be represented by the Einstein's formula: $D/\mu = kT/e$ (wherein k is Boltzmann's constant, and T is an absolute temperature), so that $E_d$ is a constant which is independent from the kind of a material. Therefore, if it is desired to make larger the electric field E, the value of $E_q$ is required to be made much larger than the value of $E_d$ and at the same time the value of $E_{ex}$ is also required to be made larger. In order to make the value of $E_q$ larger than the value of $E_d$, the values of $\Lambda$ and N are required to be made larger. However, when the value of $\Lambda$ is increased, the density of interference fringes is decreased so that when the photorefractive medium is employed as a recording element, the recording density thereof will be diminished. On the other hand, when the density N of spatial charge is increased, the spatial charge is caused to scatter, resulting in a lowering of mobility of the spatial charge.

Since the time required for generating an electric field when an external electric field is applied to a photorefractive medium is determined by the drifting speed of the charge, the lowering of mobility of the charge leads to the lowering of writing speed. Therefore, the lowering of the mobility of charge should be avoided as much as possible.

Meanwhile, when an electric field $E_{ex}$ is externally applied to a photorefractive medium, the mobile charge (carrier) transfers in the direction of the electric field, so that the electric field E coincides approximately with the direction of the external electric field. Further, since the modulation of refractive index via Pockels effect is performed in the direction of electric field, it is required, in order to read out the change in refractive index by way of an electromagnetic wave, to approach the direction of electric field so as to make it perpendicular to the incidence angle of the electromagnetic wave. Therefore, some design modification is required to be made on the electrode to be applied by an electric field, thus inviting an increase in manufacturing cost. Moreover, this conventional recording medium is not applicable to the ordinary optical disk, and hence the end-use thereof is very limited.

Furthermore, according to the conventional recording medium employing a photorefractive polymer, the enlargement of change in refractive index between those before and after the optical recording is effected by the inclusion in a large amount of a nonlinear optical material. Therefore, it is very difficult to erase an information once recorded therein.

As explained above, according to the optical recording method employing the conventional photorefractive polymer, an external electric field of very intensive magnitude is required to be applied to the recording medium, thus making it very difficult to function it as a practical device. Moreover, since a large amount of a nonlinear optical material is required to be added into the recording medium for amplifying the change in refractive index between those before and after the optical recording, it has been very difficult to erase an information once recorded therein.

There has been also studied in the manufacture of the conventional recording element to incorporate therein a compound which can be ionized or has a capability of increasing dipole moment by an external energy as a recording material. As an example of such a compound, an organic chromism material (a material exhibiting chromism) has been now studied. However, the organic chromism material is accompanied with a problem in bistability. For example, spiropyran compounds which are known as photochromic material are poor in photopic stability, and fulgide compounds are known to be poor in thermal stability (Dyestuffs and Chemicals; 1990, vol. 35, No. 11, pp 298 to 311).

As mentioned above, a compound which can be ionized by an external energy, or which has a capability of increasing dipole moment by an external energy is accompanied with too many problems in practical view point to put it into use as a recording element.

On the other hand, in the employment of organic chromism materials as a recording material for manufacturing a recording element, the improvements of these compounds regarding their bistability and thermal stability are very important problems. However, the development of the compounds having a sufficient bistability are now faced with much difficulties in absence of any specific guide regarding their molecular design.

The mobility "$\mu$" of carrier in the recording layer also gives an influence to the conductivity "$\sigma$" of a photoconductive material. In this case, the conductivity "$\sigma$" of a photoconductive material is represented by the following formula (5).

$$\sigma = n \cdot q \cdot \mu \qquad (5)$$

wherein:
$\sigma$: electric conductivity
n: the number of carrier
q: the elemental charge
$\mu$: the drift mobility of carrier The conductivity "$\sigma$" can be changed by applying an external energy, but this change is mainly caused by a change in the number of carriers "n". For example, it is possible to change the conductivity "$\sigma$" by the generation of the carrier resulting from a photoirradiation.

A device employing a photoconductive material such for example as an organic photoreceptor for use in an electrophtotography is generally composed of a laminate structure comprising a carrier-generating layer and a carrier-transporting layer. The mobility of carrier in the carrier-transporting layer depends on the material of charge-transporting layer, and can not be controlled. Accordingly, the number of carrier generated from the carrier-generating layer brings about a change in conductivity.

It is generally considered that realizing a high quantum efficiency is desirable in improving the performance of the photoconductive element. However, as far as the value of conductivity is governed by the number of carrier to be generated as mentioned above, the quantum efficiency would fundamentally never become 1 or more.

Therefore, a material that shows high mobility ($\mu$) without an external energy and large mobility-change ($\Delta\mu$) by an external energy has been failed to be developed up to date, and hence a practical device directly utilizing the change in mobility of carrier is not yet developed.

SUMMARY OF THE INVENTION

An object of the present invention is to provide a recording element which requires no electrode and is large in recording capacity.

Another object of the present invention is to provide a recording element which is capable of realizing an excellent bistability even if a compound poor in bistability is employed as a recording material, and is highly stabile to light and heat.

A further object of the present invention is to provide a recording element which makes use of changes in mobility of carrier to be brought about by the supply of external energy.

Namely, according to this invention, there is provided a recording element which comprises a recording layer containing; a first charge-generating material adapted to generate a first electric charge by a supply of external energy; a first charge-transporting material for transporting the first electric charge; a charge-capturing material for capturing the first electric charge; and a material having an electrooptical effect; wherein a change in optical properties of the recording layer is caused only through an inner electric field to be generated by a delivery of electric charge between the first charge-generating material generating electric charge and the charge-capturing material capturing the electric charge.

According to this invention, there is further provided a recording element which comprises a recording layer containing; a compound which can be ionized or has a capability of increasing dipole moment by the application of an external energy; a charge-generating material; and a charge-transporting material.

According to this invention, there is further provided a drift mobility-modulating element which comprises a recording layer containing; a charge-generating material adapted to generate an electric charge by applying external energy; a charge-capturing material for capturing the electric charge; and a charge-transporting material for transporting the electric charge; wherein a change in conductivity of the recording layer is caused by changing a drift mobility of the charge-transporting material according to an inner electric field to be generated by a delivery of electric charge between the charge-generating material generating electric charge and the charge-capturing material capturing the electric charge.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 3A and 3B respectively shows a graph illustrating energy levels;

FIG. 4 is a perspective view showing an embodiment of recording element according to this invention;

FIG. 5 is a sectional view schematically showing another embodiment of recording element according to this invention;

FIG. 6 shows the relationship between the electric dipole moment of an organic molecule and the ratio (D/μ) of the diffusion coefficient to the mobility of a film containing the organic molecule;

FIG. 7 shows the relationship between the ratio (D/μ) of the diffusion coefficient to the mobility of a film and the diffraction efficiency of an optical recording medium using said film;

DETAILED DESCRIPTION OF THE PREFERRED EMBODIMENTS

Figure 1:
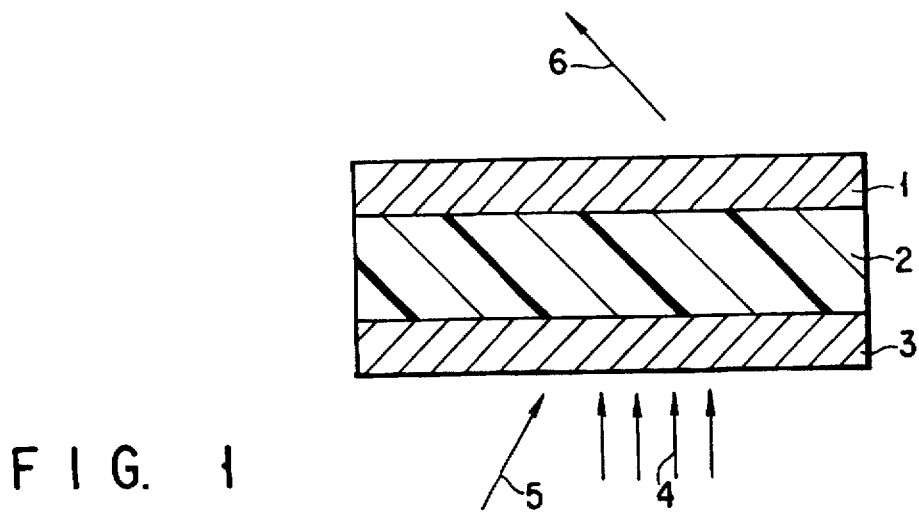
FIG. 1 is a sectional view showing a conventional recording element.

This invention will be further explained in detail with reference to the following preferred embodiments.

In accomplishing this invention, the present inventors have first taken notice of an inner electric field to be generated by the transfer of electric charge between a charge-generating material and a charge-capturing material in a system comprising the charge-generating material which is adapted to generate an electric charge by a supply of external energy such as light and heat, the charge-capturing material for capturing the electric charge thus generated, and a charge-transporting material for transporting the electric charge.

Namely, it has been found by the present inventors that an information such as that can be obtained through light irradiation can be recorded in a recording layer by changing optical properties of a recording material, for instance by changing a light absorption coefficient of a light absorptive material by way of this inner electric field.

It is preferable for the purpose of effectively generating an inner electric field to enable electric charges to easily move between the charge-generating material and the charge-capturing material. Specifically, a difference between the ionization potential of the charge-generating material and the ionization potential of the charge-capturing material should preferably be 2 eV or less. Additionally, a difference between the electron affinity of the charge-generating material and the electron affinity of the charge-capturing material should preferably be 2 eV or less. Namely, the combination of the charge-generating material and the charge-capturing material should be suitably selected in such a way that the ionization potential of the charge-capturing material becomes excessively lower than that of the charge-generating material, and at the same time the electron affinity of the charge-capturing material becomes excessively higher than that of the charge-generating material.

The principle of this invention will be further explained with reference to FIGS. 2 and 3.

FIG. 2 illustrates an energy diagram regarding the charge-generating material, the charge-capturing material and the charge-transporting material. The charge-generating material is capable of generating electrons upon absorption of an external energy such as light, the resulting electrons being taken up by the charge-capturing material (acceptor molecules). As a result, an extremely strong inner electric field is caused to generate between the electrons thus taken up and the positive electric charge remaining in the charge-generating material. When present invention is applied to a mobility-modulating element, the operation thereof is described by following principle. Then, carriers are introduced into the charge-transporting material in the region of this inner electric field from other regions through hopping or injection, and the movement of the carriers are restrained by this inner electric field. Therefore, since the carriers are restrained at the remotest site of carrier hopping rating (namely, time required for the carriers to get out of a region which is the strongest in restraint), the drift mobility of the carriers in this system is caused to change.

Figure 2A:
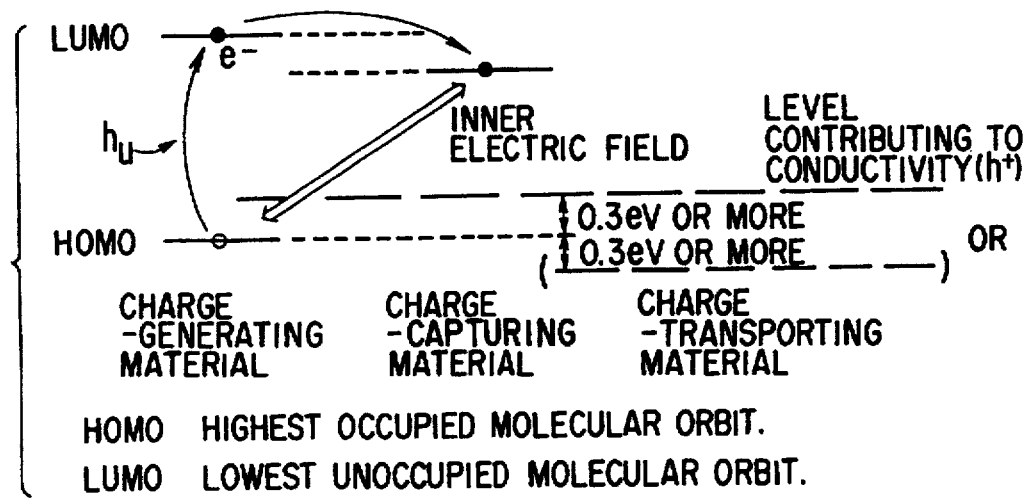
FIGS. 2A and 2B respectively shows a graph illustrating energy levels.

FIG. 2A illustrates an example where a carrier is a hole (hole) hopping within HOMO (highest occupied molecular orbit) of the charge-transporting material of this system. In this case, if the ionization potential of the charge-transporting material is of the same level as that of the ionization potential of the charge-generating material from which electrons have been given to the charge-capturing material, the positive charge on the charge-generating material which should have been contributing to the generation of the inner electric field is now injected into the charge-transporting material and hence transported as a carrier (hole). Therefore, a difference between the ionization potential of the charge-transporting material and the ionization potential of the charge-generating material should preferably be 0.3 eV or more.

Figure 2B:
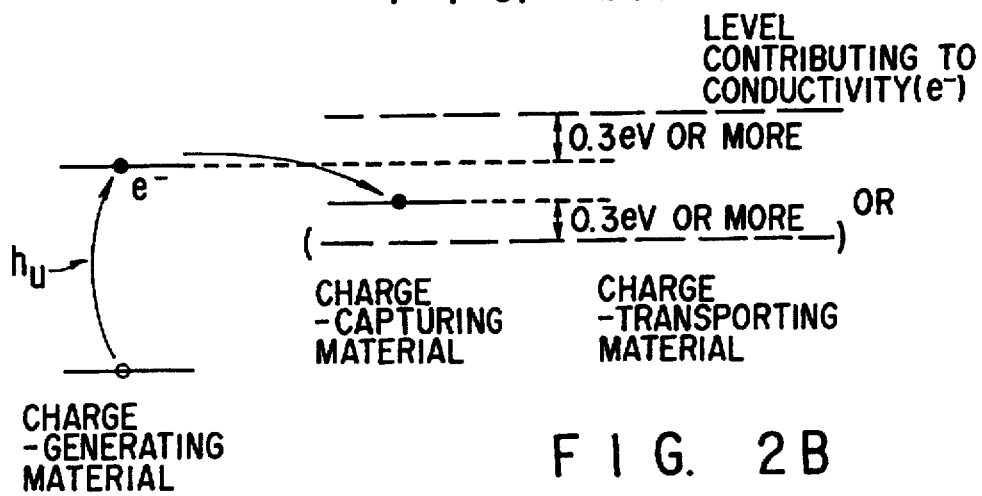

FIG. 2B illustrates an example where a carrier is an electron hopping within LUMO (lowest unoccupied molecular orbit) of the charge-transporting material. In this case, if the electron affinity of the charge-transporting material is of the same level as that of the electron affinity of the other components, the negative charge on the charge-generating material which should have been contributing to the generation of the inner electric field is now injected into the charge-transporting material and hence transported as a carrier (an electron). Therefore, a difference between the electron affinity of the charge-transporting material and the electron affinity of the charge-generating material should preferably be 0.3 eV or more, and at the same time a difference between the electron affinity of the charge-transporting material and the electron affinity of the charge-capturing material should also preferably be 0.3 eV or more.

FIG. 3 illustrates an energy diagram regarding the charge-generating material, the hole-accepting material (donor molecule) and the charge-transporting material. Because the sign of electric charge is made opposite to that shown in FIG. 2, the same explanation as explained with reference to FIG. 2 is applied except the case of the relationship regarding the magnitude of the energy level among the components reverses. Namely, as shown in FIG. 3A, in the case where the carrier is a hole, a difference between the ionization potential of the charge-transporting material and the ionization potential of the charge-generating material as well as a difference between the ionization potential of the charge-transporting material and the ionization potential of the hole-accepting material should preferably be 0.3 eV or more.

While, in the case where the carrier is an electron as shown in FIG. 3B a difference between the electron affinity of the charge-transporting material and the electron affinity of the charge-generating material should preferably be 0.3 eV or more.

The charge-generating material according to this invention is adapted to generate a carrier as it is irradiated by a light beam. Examples for this charge-generating material are an inorganic photoconductive material such as selenium and alloys thereof, CdS, CdSe, CdSSe, AsSe, ZnO, ZnS and amorphous silicon; a metallic phthalocyanine pigment of various crystalline types ($\alpha, \beta, \gamma, \delta, \epsilon, \zeta, \eta, \theta, \iota, \kappa, \lambda, \mu, \nu, \xi, o, \pi, \rho, \sigma, \tau, \upsilon, \phi, \chi, \Phi, \omega$, A, B, C, X and Y) such as titanyl phthalocyanine and vanadyl phthalocyanine and non-metallic phthalocyanine pigment of various liquid crystal types; azo-based dyes and pigments such as monoazo dye, bisazo dye, trisazo dye and tetrakisazo dye; perylene-based dyes and pigments such as perylenic acid anhydride and perilic acid imide; perinone pigment; indigoid-based dyes and pigments; quinacridone-based pigments; polycyclic quinone pigments such as anthraquinone, anthoanthrone and dibromoanthrone; cyanine dye; charge transfer complex comprising an electron-accepting material and an electron-donating material such as TTF-TCNQ; an eutectic material comprising a pyrylium or thiapyrylium dye and polycarbonate resin; azulenium salt; fullerene such as $C_{60}$ and $C_{70}$ and derivatives thereof; telephthalic acid derivatives having a carbonyl group such as dimethyl telephthalate and diethyl telephthalate; xanthene-based dyes and pigments; azulenium dye; and squarilium dye.

These charge-generating material may be employed singly or in combination of two or more kinds thereof. If two kinds of charge-generating materials which differ from each other in polarity of generating charge are employed, one of them may be used as an erasing component. Charge transfer complex is also one of effective charge-generating materials.

The ratio of the charge-generating material to the whole of the recording layer should preferably be 0.001 to 0.4 parts by weight. If the ratio of the charge-generating material is less than 0.0001 parts by weight, it would be difficult to generate sufficient amount of inner electric charge because of charge amount per volume generated by irradiation is small. on the other hand, if the ratio of the charge-generating material exceeds over 0.4 parts by weight, it would give rise to a problem in which an aggregation probability of the charge-generating material becomes higher so as to cause increasing the conductivity of the recording element. As a result, it is impossible to generate a high inner electric field.

As for the charge-transporting material to be employed in this invention, any material having a function of transporting electric charge by way of hopping conduction for example can be employed. In many cases, the charge-capturing material capable of capturing electric charge (donor type or acceptor type) can be selected from this charge-transporting material. Namely, the charge-transporting material can be used to function also as a charge-capturing material.

Examples of such a charge-transporting material are a semiconductor having an irregular structure, which is known as an amorphous semiconductor, such as Si, Ge, Se, S, Te, B, As and Sb; and other kinds of structurally irregular semiconductors such as SiC, InSb, GaAs, GaSb, CdGe$_x$As$_2$, CdSi$_x$P$_2$, CdSn$_x$As$_2$, As$_2$Se$_3$, As$_2$S$_3$, Ge-Sb-Se, Si-Ge-As-Te, Ge-As-Se, As$_2$Se$_3$-As$_2$Te$_3$, As-Se-Te, Tl$_2$Se-As$_2$Te$_3$, (Cu$_{1-x}$Au$_x$)Te$_2$, V$_2$O$_5$-P$_2$O$_5$, MnO-Al$_2$O$_3$-SiO$_2$, V$_2$O$_5$-P$_2$O$_5$-BaO, CoO-Al$_2$O$_3$-SiO$_2$, V$_2$O$_5$-GeO$_2$-BaO, FeO-Al$_2$O$_3$-SiO$_2$, V$_2$O$_5$-PbO-Fe$_2$O$_3$, TiO$_2$-B$_2$O$_3$-BaO, SiOx, Al$_2$O$_3$, ZrO$_2$, Ta$_2$O$_3$, Si$_3$N$_4$ and BN. It is also possible to use, as a charge-transporting material, a $\pi$-conjugated polymer or oligomer such as polyacetylene, polypyrrole, polythiophene and polyaniline; a $\sigma$-conjugated polymer or oligomer such as polysilane and polygermane; a polycyclic aromatic compound such as anthracene, pyrene, phenanthrene and coronene; an nitrogen-containing cyclic compound or a compound having an nitrogen-containing cyclic compound on its backbone chain or side chain, such as indole, carbazole, oxazole, iso-oxazole, thiazole, imidazole, pyrazole, oxadiazole, pyrazoline, thiathiazole and triazole; hydrazone compounds; triphenyl amines; triphenyl methanes; butadienes; stilbenes; TCNQ; anthraquinone; derivatives of diphenoquinone; and fullerene such as $C_{60}$ and $C_{70}$ and derivatives thereof.

Specific examples of these compounds useful as a charge-transporting material are chloroanil, bromoanil, tetracyanoethylene, tetracyanoquinodimethane, 2,4,7-trinitro-9-fulorenone, 2,4,5,7-tetranitro-9-tetrafulorenone, 2,4,7-trinitro-9-dicyanomethylenefulorenone, 2,4,5,7-tetranitroxanthone, 2,4,9-trinitrothioxanthone, N,N-bis(3,5-dimethylphenyl)-3,4,9,10-perylene tetracarboxyimide, diphenone, stilbenequinone and a polymer having any of these low molecular compounds on its backbone chain or side chain.

The ratio of the charge-capturing material to the whole of the recording layer should preferably be 0.00001 to 0.3 parts by weight. If the ratio of the charge-capturing material is less than 0.00001 parts by weight, it would be difficult to generate sufficient amount of inner electric field effectively because of the charge generated by the irradiation is not fully captured. On the other hand, if the ratio of the charge-capturing material exceeds over 0.3 parts by weight, it would be difficult to change the characteristics of the element effectively because of the charge generated by the irradiation is trapped by the charge-capturing material before the charge is transferred sufficient distance from the charge-generating material, and very localized inner electric field is generated.

The ratio of the charge-transporting material to the whole of the recording layer should preferably be 0.0001 to 0.7 parts by weight. It is desirable that the charge generated by irradiation is transported through hopping from the charge-generating material to the charge-transporting material, and between charge-transporting materials, finally the charge is captured by the charge-capturing material. However, if the ratio of the charge-transporting material is less than 0.0001 parts by weight, it would be difficult to generate the inner electric field because of the charge does not injected to the charge-transporting material and the charge is deactivated in the charge-generating material. On the other hand, if the ratio of the charge-transporting material exceeds over 0.7 parts by weight, it would give rise to a problem in which an aggregation or crystallization of the charge-generating material is occurred so that it is impossible to form an element in which differing molecules are dispersed.

If two kinds of charge-generating materials which differ from each other in polarity of generating charge are employed, two kinds of charge-transporting materials for transporting these two kinds of charges differing in polarity may be used. In this case, one of them may be used as a charge-transporting material for erasing as in the case of the charge-generating material.

These charge-generating material, charge-capturing material and charge-transporting material may be suitably combined so as to make it possible to modulate the inner electric field in accordance with the external energy (such as light and heat).

Meanwhile, when the generating charge is an electron, the electron affinity of the charge-generating material as well as of the charge-capturing material should preferably be controlled to not more than 2 eV, more preferably to the range of 0.1 to 2 eV. On the other hand, when the generating charge is a positive hole, the ionization potential of the charge-generating material as well as of the charge-capturing material should preferably be controlled to not more than 2 eV. When a difference in electron affinity between the charge-generating material and the charge-capturing material as well as a difference in ionization potential between the charge-generating material and the charge-capturing material are excessively large, the transfer of electric charge between the charge-generating material and the charge-capturing material will be inhibited, and hence it will become very difficult to obtain an effective inner electric field.

As a compound having an electro-optic effect that can be used in a first embodiment of this invention, the following materials will be preferably employed.

(1) a material whose absorption coefficient or reflectance can be changed by the Franz-Keldysh effect; (2) a material whose absorption coefficient, reflectance or luminous efficacy can be changed by the exciton effect; (3) a material whose refractive index can be changed by the Pockels effect; and (4) a material which is capable of changing its optical properties in an excitation state and whose life of excitation state can be prolonged by an electric field.

Specific examples of such materials are a molecule exhibiting a photochromism such as a spirobenzofuran-based molecule, a fulgide-based molecule, cyclophene-based molecule, diarylethene-base molecule, an azobenzene-based molecule, polyacrylate or polysiloxane having cyanobiphenyl group wherein a photochromic molecule is incorporated into the polymer liquid crystal, and polysiloxane having spirobenzopyrane group; and a material exhibiting a liquid crystal such as ethyl p-azoxybenzoate, ammonium oleate and p-azoxyanil. In addition, the following materials of fine particle can be used.

Examples of such a material are a semiconductor having an irregular structure, which is known as an amorphous semiconductor, such as Si, Ge, Se, S, Te, B, As and Sb; and other kinds of structurally irregular semiconductors such as SiC, InSb, GaAs, GaSb, $CdGe_xAs_2$, $CdSi_xP_2$, $CdSn_xAs_2$, $As_2Se_3$, $As_2S_3$, Ge-Sb-Se, Si-Ge-As-Te, Ge-As-Se, $As_2Se_3$-$As_2Te_3$, As-Se-Te, $Tl_2Se$-$As_2Te_3$, $(Cu_{1-x}Au_x)Te_2$, $V_2O_5$-$P_2O_5$, MnO-$Al_2O_3$-$SiO_2$, $V_2O_5$-$P_2O_5$-BaO, CoO-$Al_2O_3$-$SiO_2$, $V_2O_5$-$GeO_2$-BaO, FeO-$Al_2O_3$-$SiO_2$, $V_2O_5$-PbO-$Fe_2O_3$, $TiO_2$-$B_2O_3$-BaO, $SiO_x$, $Al_2O_3$, $ZrO_2$, $Ta_2O_3$, $Si_3N_4$ and BN. It is also possible to use, as a charge-transporting material, a π-conjugated polymer or oligomer such as polyacetylene, polypyrrole, polythiophene and polyaniline; a σ-conjugated polymer or oligomer such as polysilane and polygermane; a polycyclic aromatic compound such as anthracene, pyrene, phenanthrene and coronene; an nitrogen-containing cyclic compound or a compound having an nitrogen-containing cyclic compound on its backbone chain or side chain, such as indole, carbazole, oxazole, iso-oxazole, thiazole, imidazole, pyrazole, oxadiazole, pyrazoline, thiathiazole and triazole; hydrazone compounds; triphenyl amines; triphenyl methanes; butadienes; stilbenes; TCNQ; anthraquinone; derivatives of diphenoquinone; and fullerene such as $C_{60}$ and $C_{70}$ and derivatives thereof.

It is also possible to employ an inorganic photoconductive material such as selenium and alloys thereof, CdS, CdSe, AsSe, ZnO and amorphous silicon; phthalocyanine dyes and pigments such as a metallic phthalocyanine pigment and non-metallic phthalocyanine pigment; azo-based dyes such as monoazo dye, bisazo dye, trisazo dye and tetrakisazo dye; perylene-based dyes and pigments; indigoid-based dyes and pigments; quinacridone-based pigments; polycyclic quinone pigments such as anthraquinone and anthoanthrone; cyanine dye; charge transfer complex comprising an electron-accepting material and an electron-donating material such as TTF-TCNQ; an eutectic material comprising a pyrylium dye and polycarbonate resin; and azulenium salt.

These material may be employed singly or in combination of two or more kinds thereof.

The ratio of the material to the whole of the recording layer should preferably be 0.001 to 0.8 parts by weight. If the ratio of the charge-generating material is less than 0.001 parts by weight, it would be difficult to obtain a sufficient change in optical properties. On the other hand, if the ratio of the charge-generating material exceeds over 0.8 parts by weight, it would give rise to a problem of difficulty to generate an inner electric field.

These compounds having an electro-optic effect may also be utilized as a molecule having additionally a charge-transporting function.

According to a first embodiment of this invention, at least one of the aforementioned charge-generating material, charge-capturing material, charge-transporting material and a compound having an electro-optic effect should preferably be selected to have a dipole moment of 3.5 Debye or more. Preferably, a molecule having an ability of transporting the charge should be formed of a molecule having such a magnitude of electric dipole moment in view of promoting the diffusion of the charge. In this case, the dipole moment of the charge-transporting material should preferably be 4.0 Debye or more, more preferably 4.5 Debye or more.

If the concentration of the molecules not provided with the charge-transporting function is increased, the concentration of the molecules having a charge-transporting function is proportionately decreased. Therefore, the dipole moment of the molecules which are not provided with the charge-transporting function should preferably be set somewhat higher. Specifically, the dipole moment of the molecules having no charge-transporting function should preferably be set to 4.0 Debye or more, more preferably 4.5 Debye or more, and most preferably 5.0 Debye or more.

The molecules having a charge-transporting function and/or the molecules having no charge-transporting function may be a single molecule, a polymer or a copolymer copolymerized with other kind of polymer.

The present inventors have found after an extensive studies that when the dipole moment becomes larger, the mobility of carrier is correspondingly lowered, and succeeded to accomplish this invention on the basis of this finding. Followings are details on this finding resulted in this invention.

The present inventors have already established a method of concurrently measuring the mobility and the diffusion coefficient through the analysis of transient photocurrent (A.

Hirao, H. Nishizawa and M. Sugiuchi; Physical Review Letters. Vol. 75, No. 9, pp 1787 to 1790, 1995). The method is performed as follows. Namely, first of all, a film-like sample is interposed between a pair of electrodes, and a specific light pulse is irradiated from one of the electrodes. This specific light pulse is a kind of light pulse which is capable of generating a photocarrier that can be absorbed solely at the vicinity of interface, the pulse being around one nanosecond. The values measured of the transient current passed through in the irradiation of light pulse is then combined with the formula obtained analytically to obtain the diffusion coefficient "D" and the mobility "$\mu$".

With the employment of this method, the diffusion coefficient "D" and the mobility "$\mu$" were measured respectively on a sample where a molecule having a charge-transporting function is dispersed in a polymer, as well as on a sample where a molecule having a large dipole moment but not having a charge-transporting function is added to a molecule having a charge-transporting function and a small dipole moment. As a result, it has been found that when the dipole moment becomes larger, the ratio (D/$\mu$) between the diffusion coefficient "D" and the mobility "$\mu$" is correspondingly increased. Namely, it has been found that if the ratio (D/$\mu$) becomes larger, the electric field $E_d$ due to the diffusion becomes larger according to the aforementioned formula (3), hence the applying of an electric field from outside becomes unnecessary.

Normally, since the Einstein's formula: D/$\mu$=kT/e (wherein k is Boltzmann's constant, and T is an absolute temperature) is prevailed, D/$\mu$ is a constant which is independent from the kind of a material. In this invention however, the charge-transporting molecule utilized is not in the most stable crystalline state, but in the amorphous state. Moreover, the overlapping of wave functions between charge-transporting molecules is sufficiently small. Therefore, the energy exchange between a pair of molecules is substantially not taken place, and hence under such a condition, electric charge can not necessarily be transferred to a stable molecule. Accordingly, it is impossible in the case of this invention to realize "a thermal equilibrium state", which is a condition for satisfying the aforementioned Einstein's formula (for example, R. Richert, L. Pautmeier, and H. Bassler, Phys. Rev. Lett. 63, 547, 1989). As a result, D/$\mu$ becomes dependent on the kind of a material in the case of this invention.

Up to date, the possibility that this D/$\mu$ would not meet the Einstein's formula is merely suggested through a simulation (P. M. Borsenberger, E. H. Magin, M. van der Auweraer, and F. C. de Schryver, Phys. Status Solidi (a). 140, 9, 1993). Whereas, the present inventors have succeeded to confirm this possibility by actually measuring the D/$\mu$. The reason why the value of D/$\mu$ becomes larger as the dipole moment is increased can be explained from the fact that as dipole moment becomes larger, the mobility becomes smaller proportionately. It is possible to increase this dipole moment by enlarging the dipole moment of a molecule having a charge-transporting function, or by the addition of a molecule having a dipole moment (for example, Sugiuchi and Nishizawa; Journal of Imaging Science and Technology, Vol. 37, No. 3, pp 245 to 250, 1993; H. Valerian, E. Brynda, S. Nespurek, and W. Schnabel, J. Appl. Phys. 78, 6071, 1995). It is possible to lower the mobility by increasing the dipole moment by employing either one of the methods.

Namely, according to the first embodiment of this invention, the increase of the dipole moment can be effected by increasing the dipole moment of a molecule having a charge-transporting function, or by increasing the dipole moment of other molecules.

The following points should be mentioned regarding to the reason of why the mobility becomes lower as the dipole moment is increased. Namely, the electrostatic potential on each of charge-transporting molecule takes various values as it is influenced by the electric field generated by the dipole moment, so that the energy distribution of charge-transporting molecule will be extended to a distribution width of 0.1 eV (for example, A. Dieckmann, H. Bassler, and P. M. Borsenberger, J. Chem. Phys. 99, 8136, 1993). By contrast, the gain of potential resulting from the transfer of electric charge in the direction of external electric field is very small. For example, the gain of potential resulting from the hopping at a distance of 1 nm of electric charge in the electric field of 1 MV/m is only 1 meV. Thus, the gain of electrostatic potential is relatively large as compared with the gain of potential resulting from the transfer of electric charge in the direction of external electric field, so that the transfer of electric charge in the direction of electric field is not necessarily stable in viewpoint of energy. Namely, the electric charge may tend to move in a direction other than the direction of electric field, thus minimizing the mobility.

In view of the reasons as explained above, the molecule having a dipole moment according to the first embodiment of this invention should preferably be selected from a material other than the material whose refractive index is fluctuated by the presence or absence of electric field. Specifically, the dipole moment of the charge-transporting material, the charge-generating material, or an additive to be subsequently added should preferably be 3.5 Debye or more. The fluctuation of refractive index due to an electric field means the fluctuation of electronic polarization so that the fluctuation of electronic polarization due to an electric field is suggesting that the position of electron is fluctuated by an electric field. The reason of why the employment of a compound whose refractive index changes by the presence or absence of electric field is not preferable can be explained as follows. Namely, the molecule of such a compound is more likely to be influenced by the electric field to be generated by the dipole moment around there so that the electrons within the molecule is caused to polarize even if the permanent dipole moment thereof is large. As a result, the inner electric field is weakened, and the energy distribution width of the charge-transporting molecule may be minimized.

As explained above, since the energy distribution is caused to generate by the fluctuation of electric field, and the electric charge moving within this energy distribution is not necessarily moving in the direction of this external electric field, the phenomenon of the lowering in mobility of electric charge will be brought about. It should be noted however that the microscopic transfer rate (hopping) of electron is not decreased at all. Thus, since the electric charge is moving in every directions, the transfer rate of the electric charge is seemed to be relatively decreased as far as the transfer in the direction of the external electric field is concerned (for example, H. Bässler, Phys. Status Solidi (b) 175, 15, 1993). Consequently, the diffusion rate "D" which is the speed of electric charge expanding in every directions can be hardly influenced by the dipole moment, whereas the mobility "$\mu$" becomes smaller as the dipole moment becomes larger, thus enlarging the value of D/$\mu$.

As clear from the aforementioned formula (1), when this D/$\mu$ becomes larger, the inner electric field becomes larger, thus making the presence of external electric field unnecessary, and hence the electrode for applying the external electric field can be dispensed with. The electric field $E_d$ by the diffusion of a material in general is 0.163 MV/m under the conditions of room temperature (300K.) and spatial wavelength Λ=15 µmm. Meanwhile, in the case of the conventional photorefractive polymers that have been studied up to date, the electric field applying from outside is 10 MV/m or more (for example, W. E. Moerner and Scott M. Silence, Chem. Rev. 94, pp127–155. 1994). Therefore, in view of the aforementioned formula (1), when D/µ is 5 or more, preferably 10 or more, the generation of inner electric field by the diffusion of the same level as that of the external electric field can be made possible.

Summarizing it, in the case of ordinary material, the following two conditions have to be met in order to make the relationship between the mobility and diffusion coefficient applicable to the Einstein's formula. Namely, the carrier generated from the thermal transition between energy gaps is kept in the state of equilibrium; and the diffusion is derived from the fluctuation of heat.

Whereas, in the system of this invention, the carrier is generated by light and kept in a non-equilibrium state. Moreover, the diffusion is derived from the fluctuation of electric field generated by a dipole moment. These conditions are not applicable to the Einstein's formula. As a result, it is possible to enlarge the D/µ as long as molecules having a large dipole moment or the positions or sites thereof are existed at random.

According to the recording layer of the recording element of the first embodiment of this invention, a pair of positive charge and negative charge are allowed to generate through the irradiation of light under the presence of a molecule (the charge-transporting material) which is capable of transporting only either one of electric charge selected from positive charge and negative charge. Then, the diffusion of electric charge is caused to generate by the effect of random electric field, thereby spatially separating the electric charge into a positive charge and a negative charge to generate a diffused electric field. The electron structure of the material is then caused to modulate with this diffused electric field, resulting in the modulation in optical feature of the material. Alternatively, the life of excitation state caused by the application of heat or light is extremely prolonged by the electric field, thereby performing the reading of the change in this optical properties. Since the inner electric field can be easily enlarged without supplying outer electric field by incorporating a molecule having a relatively large dipole moment into the recording layer of recording element as mentioned above, it is possible to extremely enhance the efficiency of the recording element.

Furthermore, according to the first embodiment of this invention, it is possible to incorporate two kinds of charge-generating materials each generating an electric charge of different polarity from each other into the recording layer. In the following explanation, a charge-generating material for writing is designated as a first charge-generating material, and a charge-generating material for erasing is designated as a second charge-generating material. In this case, an erasable recording element can be obtained by selecting the materials in such a way that the ionization potential and electron affinity of each components meet the following equations.

$$Ip(g) > Ip(ct) > Ip(tr)$$

$$X(tr) > X(e)$$

wherein Ip(g) represents the ionization potential of the first charge-generating material, Ip(ct) represents the ionization potential of the first charge-transporting material and Ip(tr) represents the ionization potential of the charge-capturing material. On the other hand, X(tr) represents the electron affinity of charge-capturing material and X(e) represents the electron affinity of the second charge-generating material.

In this case, when the energy distribution width σ(ct) of the first charge-transporting material and the energy distribution width σ(tr) of the charge-capturing material are taken into account, the ionization potential should preferably be selected to meet the following relationships.

$$Ip(g) > Ip(ct) - \sigma a(ct) > Ip(tr) + \sigma(tr)$$

When a charge-generating material for erasing is further added as the second charge-transporting material to the above composition, the ionization potential and electron affinity should preferably be selected to meet the following relationships.

$$Ip(g) > Ip(ct) > Ip(tr)$$

$$X(tr) > X(rt) > X(e)$$

wherein Ip(g) represents the ionization potential of the first charge-generating material, Ip(ct) represents the ionization potential of the second charge-transporting material and Ip(tr) represents the ionization potential of the charge-capturing material. On the other hand, X(tr) represents the electron affinity of charge-capturing material, X(rt) represents the electron affinity of the second charge-transporting material and X(e) represents the electron affinity of the second charge-generating material.

The recording layer of the recording element according to the first embodiment of this invention can be formed by coating a composition comprising the aforementioned charge-generating material, charge-transporting material, charge-capturing material and a compound having an electro-optic effect on a suitable supporting body.

This composition to be used for coating can be prepared by dissolving the components in a solvent such as trichloroethane, or toluene at a prescribed ratio.

When the component such as the charge-generating material to be used in the first embodiment of this invention is not a polymer, a polymer may be added to the aforementioned components. The polymer suited for use in this case should preferably be optically inert and be designed in terms of molecular weight etc. in such a way, though it is not essential, that the glass transition point thereof becomes 100° C. or lower. Examples of such a polymer are polyethylene resin, nylon resin, polyester resin, polycarbonate resin, polyacrylate resin, butyral resin, polystyrene resin, styrene-butadiene copolymer, polyvinyl acetal resin, diallyl phthalate resin, silicone resin, polysulfone resin, acrylic resin, vinyl acetate resin, polyphenylene oxide resin, alkyd resin, styrene-maleic anhydride copolymer, phenol resin, vinyl chloride-vinyl acetate copolymer, polyester carbonate resin, polyvinyl chloride, polyvinyl acetal, polyacrylate and paraffin. These polymers may be used singly or in combination of two or more kinds.

The aforementioned composition may further comprise known additives such as an anti-oxidant, an ultraviolet light absorber, etc. Examples of such additives are hindered phenolic, aromatic amines, organic sulfur compounds, phosphites, chelating agents, benzophenones, benzotriazoles and nickel complexes. The content of these additives should preferably be in the range of $1 \times 10^{-6}$ to $5 \times 10^{-2}$ parts by weight based on the amount of the whole of the recording layer.

The composition containing the aforementioned components may be mixed with a solvent when it is to be employed as a coating material. Examples of such a solvent are alcohols, ketones, amides, sulfoxides, ethers, esters, aromatic halogenated hydrocarbons and aromatic hydrocarbons.

According to the first embodiment of this invention, the film of recording layer may be formed in various ways. For example, the film may be formed by suitably selecting any of a vacuum deposition method, a sputtering method and a plasma CVD method utilizing glow discharge. When a polymer is employed in the composition, the polymer may be dissolved together with a material having a carrier-transporting function in an organic solvent at a prescribed amount to obtain a homogenous solution, which is then coated by way of dip coating for example and thereafter dried. The content of each component in this case, should be selected as follows. Namely, the content of charge-generating material should preferably be $1\times10^{-4}$ to $4\times10^{-1}$ parts by weight based on the solid component constituting the recording layer; the content of charge-transporting material should preferably be $1\times10^{-4}$ to $7\times10^{-1}$ parts by weight based on the solid component constituting the recording layer; and the content of the compound having an electro-optic effect should preferably be $1\times10^{-3}$ to $8\times10^{-1}$ parts by weight based on the solid component constituting the recording layer. When a material having a carrier-transporting function is selected as the aforementioned polymer, the content of the charge-capturing material can be diminished, or totally omitted under some circumstances. Further, if the material having a carrier-transporting function has a film-forming property, the content of the polymer may be minimized.

As for the method of forming the recording layer, various coating methods such as a spin-coating method, a dip-coating method, a roller-coating method, a spray-coating method, a wire bar-coating method, a blade-coating method, etc.; a vacuum deposition method; a sputtering method; and a plasma CVD method utilizing glow discharge may be employed.

The film thickness of the recording layer may be 0.1 to 500 μm in general, but the specific thickness can be suitably determined depending on the composition and on the properties demanded of the recording element.

With respect to a supporting body to be used for coating a solution containing a composition containing the aforementioned components to form a film thereof according to the first embodiment of this invention, the one having a suitable thickness, hardness as well as a sufficient toughness to withstand the treatment can be used.

This supporting body may be used not only as a supporting body for forming a film, but also as a substrate for the recording element of the first embodiment of this invention. Namely, the recording element according to the first embodiment of this invention may be composed of a substrate and a recording layer formed on the substrate. In this case, the material for this substrate should be suitably selected depending on the constitution of the recording element. Namely, if the recording element is fabricated such that light is irradiated from the back surface of the substrate where the recording is formed, the substrate is required to be transparent in some degree. Thus, any suitable material will be employed as far as it is transparent in the wavelength region of light source to be employed. The wavelength of light source is 780 nm if a semiconductor laser is employed; 630 nm if LED is employed; and 580 nm if EL is employed. Ordinary resins are transparent in the visible region ranging from 400 to 600 nm, and many of the resins are still transparent in the long wavelength region of up to about 800 nm. Therefore, the employment of polyvinyl chloride, polyvinylidene chloride, polyethylene, polycarbonate, polyester, polyamide, acrylic resin or polyimide may be suited for the substrate.

These materials for the substrate may be of flat sheet or of cylindrical sheet if required. If a substrate of cylindrical shape is to be employed, the substrate is required to have a suitable flexibility.

According to the first embodiment of this invention, if required, a protective layer may be formed on the recording layer. Any known protective materials may be employed for this purpose. For example, a thermosetting resin such as acrylic resin, fluoroplastics, silicone resin and melamine resin; a photo-curing resin; an EB-curing resin; an X-ray-curing resin; and a UV-curing resin may be employed.

It is also possible to incorporate a little amount of additives such as an anti-oxidant, an ultraviolet light absorber, aging resistor, etc. Examples of such additives are hindered phenolic, aromatic amines, organic sulfur compounds, phosphites, chelating agents, benzophenones, benzotriazoles and nickel complexes.

Depending on the film thickness and end-use of the recording layer, the recording element of the first embodiment may be prepared by a process wherein, after the formation of a recording layer on a suitable substrate followed if required by the deposition of a protective layer, the substrate is stripped off to obtain the recording element.

The recording element of this invention can be employed for the manufacture of an optical memory, a holographic optical element or a holographic interferometer. This invention will be explained with reference to FIG. 4 wherein the recording element of this invention is applied to a hologram memory which is one of the optical memory. According to system of this hologram memory, it is possible to write an information en bloc on the whole surface of the element, and then to read out the information at once which has been written in the element. The reference numeral 41 in FIG. 4 represents a recording layer and 42 a transparent supporting layer formed of quartz glass.

As seen from FIG. 4, the recording layer 41 is shaped into a rectangular parallelepiped so as to display a three-dimensional coordinates (X, Y, Z), each being rectangular to each other. An image display element (pager) 48 is disposed in parallel with the X-Y plane of the element, and a reading device 47 is also disposed in parallel with the X-Y plane and in opposite to the image display element 48 with the element being interposed therebetween. The image display element may be a liquid crystal element, a Pockels readout optical modulator, a multichannel spatial modulator, a CCD liquid crystal element, an Si-PLZT element, a deformed-surface type element, an AO or EO modulator or a magnetic optical effect element. As for the readout device, any kind of photoelectric transfer element such as a CCD, a photodiode, a photoreceptor or a photomultiplier tube may be employed.

Writing of information into the element can be performed by the following procedure. As a writing light, a coherent light represented by laser can be employed. The wavelength of the laser may be suitably selected depending on the kind of element to be employed. For example, the conventional gas laser, liquid laser, solid laser or semiconductor laser may be employed.

It is also possible to employ a pair of coherent lights. For example, a laser light may be separated into two beams by way of a beam splitter, one of the beams being employed as a reference beam, and the other being employed as an object beam as shown in FIG. 4 wherein the object beam is indicated by 43 and the reference beam by 45.

When the writing of information is to be performed with this construction, a reflecting light from an object recording an object beam, or a light passed through a transparent type image display element constituted by a liquid crystal display element etc. is irradiated onto the element, and at the same time a reference beam is irradiated in such a manner that it intersects with the light from the object beam and covers the irradiation surface. Specifically, the writing can be performed in the following manner. At first, a digitized image data is supplied to the image display element 48 to display it. Then, an object beam expanded via a beam expander into a parallel light is irradiated onto the image display element 48 and the resultant transmitted light is irradiated onto an element. At the same time, the reference beam is irradiated at an angle selected from 0.001° to 179.999°. In this case, the reference beam 45 which has been expanded via a beam expander into a parallel light is employed. It is also possible to perform a multiple recording by changing the angle of the reference beam.

In this case, by the superimposition of the object beam 43 and the reference beam 45, interference fringes are caused to generate, thus generating an inner electric field and hence the modulation of optical properties thereby forming a diffraction grating.

When the data thus written is to be read out, the object beam 43 is shut off at first, only the reference beam 45 is irradiated in the same manner as in the case of writing. A reader 47 is disposed at the place to which the object beam 43 passed through is directed (44) and which is displaced so as not to overlap with the reference beam, so that a reproduced image can be observed by this reader 47.

The position of the reader 47 is not limited to that as explained above, but may be disposed at the place to which the object beam 43 is reflected (46) and which is displaced so as not to overlap with the reference beam 45.

The data written in the element can be erased en bloc by irradiating a light all over the whole surface thereof, or can be erased partially by irradiating a laser beam. In this case, the erasing light may be manipulated by scanning it with a polygon mirror.

The methods of writing of an information into the recording element of this invention and reproducing of an information from the recording element are not limited to those explained above, but the writing of an information can be performed by scanning a laser beam all over the surface by using a polygon mirror such as Computer Generated Hologram. The data written in the whole surface of the element can be read out en bloc by irradiating the reference beam onto the element.

When the writing and reading are to be performed in this manner, a laser beam scanning device is disposed on one side where one of the elements is disposed so as to make it parallel with the X-Y plane of the element. At the same time, a reader such as a CCD element is also disposed in parallel with the X-Y plane and in opposite to the laser beam scanning device with the element being interposed therebetween. When a writing is to be performed, a bit data of an image which has been Fourier-transformed in advance is written in the element by using a laser beam such as Computer Generated Hologram. The data written in this manner is then read out by the following procedures. When a laser beam expanded with a beam expander is irradiated from the side where a laser operation device is disposed, the reader such as a CCD element disposed on the light-outgoing side is actuated to perform the read out of the data.

According to the methods of writing and reproducing an information explained above, the pager (an image display device) and the reader are both disposed so as to make them parallel with the X-Y plane of the element. The layout of these devices however is not limited to the above example, but may be changed in such a way where the pager is disposed obliquely to the X-Y plane of the element.

The writing may also be performed by irradiating two separate beams instead of adopting a method of splitting a single laser beam by way of a beam splitter as explained above. Furthermore, the irradiation of the object beam is not necessarily performed in concurrent with the irradiation of the reference beam, but the formation of the interference fringes on the element may be carried out by employing any other method.

The recording element according to the first embodiment of this invention is provided with a recording layer whose optical properties can be altered by the effect only of the inner electric field. This inner electric field is generated as a result of the delivery of electric charge between the charge-generating material and the charge-capturing material. Therefore, an electrode for applying an external electric field can be dispensed with, and at the same time it is possible to obtain a recording element having a large recording capacity.

Whereas according to the conventional recording element, although it is possible to obtain a large recording capacity, it requires electrodes so that the end-use thereof rather restricted. Since electrodes are no more required according to the first embodiment of this invention, the end-use thereof can be extremely expanded and at the same time the manufacturing cost thereof can be reduced. Moreover, in the case of the conventional materials, since the refractive thereof is caused to change in the recording, the film thickness of the material is required to be increased in order to attain a sufficient optical path difference. Whereas in the case of the first embodiment of this invention, the film thickness can be reduced thereby making it possible to easily obtain a uniform film. As a result, it is possible to stabilize the properties of the element, and to manufacture a recording element at low cost.

Next, a recording element according to a second embodiment of this invention will be explained.

The recording element according to a second embodiment of this invention is featured in that a compound which can be ionized or has a capability of increasing dipole moment by the application of an external energy is incorporated as recording material into a recording layer. This compound is turned into a prescribed state upon receiving an external energy, and this prescribed state is fixed by the application of electric field of fine region generating from a light excitation.

As in the case of the first embodiment of this invention, according to the second embodiment of this invention, a charge-generating material and a charge-transporting material are incorporated into the recording layer and an inner electric field is caused to generate by an light excitation within the recording layer thus making it possible to utilize this inner electric field.

The principle of the recording element will be further explained with reference to the following drawings.

FIG. 5 illustrates a schematical structure of the recording element. Referring to FIG. 5, this recording element comprises a substrate 11 on which a conductive layer 12 and a recording layer 13 are successively formed. This recording layer 13 contains therein a hole-generating material 14, an electron-generating material 15, a hole-transporting material 16, an electron-transporting material 17, a chromic compound 18 as a compound which can be ionized or has a capability of increasing dipole moment by the application of an external energy, and a matrix polymer material 19. This matrix polymer material 19 may not be necessarily included within the recording layer 13, when other component is polymer material.

The operation of this recording layer 13 is performed as follows.

(1) By irradiating an interference wave of light or a fluctuated magnitude of light from the recording layer 13 onto the recording element, the hole-generating material 14 (or the electron-generating material 15) dispersed within the element is optically excited, thus generating an electric charge.

(2) The hole (positive hole) generated is transferred in the form of diffusion or drift by means of the hole-transporting material 16 (or the electron-transporting material 17) to a very small distance away to be trapped thereat.

(3) As a result, an inner electric field is generated between the hole thus trapped and the electron that could not be transferred, or between the electron thus trapped and the hole that could not be transferred.

(4) Then, the chromic compound 18 within the recording layer is caused to ionize or the dipole moment thereof is caused to change by the application of an external energy such as light and heat, and the state of the chromic compound is fixed by the inner electric field generated at the aforementioned step (3), thus recording an information.

(5) The erasing of the recorded information can be performed by applying a temperature of around the glass transition temperature of the matrix polymer 19 to the element as a whole.

It is also possible in the aforementioned step (5) to erase the information recorded by optically exciting a charge-generating material which is adapted to generate an electric charge opposite in sign to the charge transferred at the occasion of recording, thereby offsetting the trapped carrier according to the aforementioned principle.

In the structure shown in FIG. 5, a pair of charge-generating materials differing in sign of charge, as well as a pair of charge-transporting materials differing in sign of charge are employed respectively. However, these charge-generating material and charge-transporting material may be formed of a single kind of material, respectively. For example, only a hole-transporting material may be used when a hole is to be generated, or only an electron-transporting material may be used when an electron is to be generated, without diminishing the effect of improving the bistability. In this case, the erasing of recorded data may be performed by the application of heat.

As for the charge-generating material to be useful in the second embodiment of this invention, the same material as employed in the first embodiment can be employed. In this case, only a single kind of material or two or more kinds of materials may be used. Likewise, as for the charge-transporting material to be useful in the second embodiment of this invention, the same material as employed in the first embodiment can be employed. When, in this case, a pair of charge-generating materials differing in sign of charge, as well as a pair of charge-transporting materials differing in sign of charge are employed respectively, one of them may be employed for erasing a recorded data as explained with reference to FIG. 5.

Namely, when a charge-generating material for erasing and a charge-transporting material for erasing are both contained in the recording layer, the data written in the element can be erased partially by irradiating a light.

Meanwhile, the dipole moment of the charge-transporting material should preferably be 3.5 Debye or more because of the same theory as in the case of the recording element of the first embodiment of this invention.

As for the examples of the compound which can be ionized or has a capability of increasing dipole moment by the application of an external energy, dye-based compounds or liquid crystal compounds may be employed. Specific examples of dye-based compounds are spiropyrans such as spiroindolinobenzopyran, naphthopyran, spirobenzothiazolyl, spiropyanopyran, spiroindolinonaphthooxazine, spiroquinolino and pyridinopyran; fulgides such as dimethylene succinic anhydride derivatives; dihydropyrene; fuloran; stilbene; indigo; thioindigo; dithienylethylene; azo dyes; indolidine; triarylmethane dyes; diarylethene; viologen derivatives; aziridine; polymethine; bianthrone such as diphenylmethyleneanthrone; dixanthilene such as diphenylmethylene xanthene and 10-(9-difluoridene)-xanthene; xanthiridene anthrone; diflavilene; oxazine; and anthracene. Examples of liquid crystal compounds are a nematic liquid crystal, a cholesteric liquid crystal, a smectic liquid crystal, or a polymer which is capable of forming a liquid crystal phase having a nematic, cholesteric or smectic molecular configuration. Among them, a chromic compound which can be optically ionized is preferable in particular.

The recording layer of the recording element according to the second embodiment of this invention can be formed by coating a composition comprising the aforementioned charge-generating material, charge-transporting material and chromic compound on a suitable supporting body. The composition to be used for coating can be prepared by homogeneously dissolving the components in a solvent such as trichloroethane, or toluene at a prescribed amount.

When the component such as the charge-generating material to be used in this embodiment is not a polymer, a matrix polymer may be added to the aforementioned components as in the case of the aforementioned first embodiment.

The mixing ratio of these components in the recording layer of the recording element should be selected as follows. Namely, the content of the charge-generating material should preferably be 0.1 to 50% by weight, more preferably 0.1 to 20% by weight; the content of the charge-transporting material should preferably be 10 to 80% by weight, more preferably 10 to 50% by weight; the content of the chromic compound should preferably be 0.1 to 20% by weight, more preferably 0.1 to 10% by weight; and the content of the matrix polymer material should preferably be 30 to 80% by weight, more preferably 30 to 70% by weight.

The composition comprising the aforementioned components is dissolved in a suitable solvent and then coated on a suitable supporting body as in the case of the first embodiment to form a film on the supporting body, thereby obtaining a recording element of the second embodiment of this invention.

As for the method of forming the recording layer, various coating methods may be employed depending on the kinds of the charge-generating material to be used. For example, a spin-coating method, a dip-coating method, a roller-coating method, a spray-coating method, a doctor blade-coating method, etc. may be employed.

The film thickness of the recording layer may be suitably determined depending on the combination of the matrix polymer, the charge-generating material, the charge-transporting material or the chromic compound. Generally however, a preferable range of the film thickness is from 0.1 to 200 µm.

According to the second embodiment of this invention, the supporting body to be used for forming a recording layer can also be utilized as a substrate for the recording element. In this case, any of material as explained with reference to the first embodiment can be employed as the substrate.

In particular, the substrate having an electric conductivity can be used as a substrate for the recording element of this embodiment. There is no limitation regarding the structure of the substrate. Namely, a substrate which is conductive per se, or an insulative substrate having on its surface a conductive layer may be used in this case. As for the conductive substrate, any suitable conductive materials may be selected depending on the kind of the charge-transporting material. Specific examples of such a conductive substrate are a metallic substrate made of brass, aluminum, gold and silver; a laminate comprising a metallic substrate made of any of the aforementioned metals and covered with a thin plastic film; a metal-coated paper; a metal-coated plastic sheet; ITO, chromium oxide, tin oxide; and a glass or plastic sheet coated with a conductive polymer.

When the recording element of this second embodiment is to be applied to a back surface-exposure system, a substrate comprising a sheet exhibiting a transparency in a prescribed wavelength region, and a pair of conductive layers exhibiting the aforementioned transparency and formed respectively on both surfaces of the sheet may be employed. Such a substrate can be prepared by vapor-depositing a metal or a metal oxide on the sheet, or by coating a dispersion comprising conductive particles dispersed in a binder on the sheet and then drying (or curing) the dispersion. The conductive surface thus formed may be used for an electrical connection or may be earthen or separately earthen if required.

The recording of information in the recording element according to this second embodiment may be performed in the same manner as explained with reference to the recording element of the first embodiment. Likewise, the erasing of the recorded information can be performed in the same manner as that of the first embodiment. Namely, the erasing of the recorded information can be performed by irradiating a laser beam onto the recording element if a charge-generating material for erasing is contained in the recording layer, whereas if a charge-generating material for erasing is not contained in the recording layer, the erasing of the recorded information can be performed by applying a temperature of around the glass transition temperature (for example, 50° to 200° C.) of the matrix polymer.

The recording element according to the second embodiment is provided with a recording layer containing two kinds of components capable of generating an inner electric field and a recording material. Since the state of this recording material can be changed by the application of an external energy and this state can be fixed by the inner electric field, the bistability of the recording layer can be remarkably improved.

In the followings, the drift mobility modulating element according to the third embodiment of this invention will be explained.

As mentioned above, the present inventors have first taken notice of an inner electric field to be generated by the transfer of electric charge that has been caused by a supply of external energy in a system comprising the charge-generating material adapted to generate an electric charge by a supply of external energy and the for capturing the electric charge thus generated. As a result, it has been found after a profound study by the present inventors that the drift mobility of the carrier (electron or hole) can be greatly altered by this internal energy.

Therefore, information of such as light irradiation can be recorded not only as a change in optical properties, but as a change in mobility of charge within the recording layer or as a change in conductivity resulting from the change of this mobility.

In the drift mobility modulating element of this invention, all of the charge-generating material, the and the charge-transporting material may be constituted by the same compounds as explained in the above embodiments.

In order to effectively generate the inner electric field, it is desirable to establish a condition wherein electric charge can be more easily transferred between the charge-generating material and the charge-capturing material, so that the difference in ionization potential or in electron affinity should preferably be controlled to 2 eV or less. Namely, the combination of these materials should be suitably selected so as to prevent the ionization potential of the charge-capturing material from becoming too low as compared with that of the charge-generating material, or to prevent the electron affinity of the charge-capturing material from becoming too high as compared with that of the charge-generating material.

All of the charge-generating material, the charge-capturing material and the charge-transporting material can be selected so that the drift mobility of the charge-transporting material can be effectively modulated by the application of an external energy. The mixing amount of these components may be suitably selected. For example, the content of charge-generating material should preferably be $1\times10^{-4}$ to $4\times10^{-1}$ parts by weight based on the recording layer; the content of charge-transporting material should preferably be $1\times10^{-4}$ to $5\times10^{-1}$ parts by weight based on the recording layer; and the content of the charge-capturing material should preferably be $1\times10^{-5}$ to $3\times10^{-1}$ parts by weight based on the recording layer.

The recording layer of the drift mobility modulating element of this invention can be formed by coating a composition comprising the aforementioned charge-generating material, charge-transporting material and charge-capturing material on a conductive substrate. The composition to be used for this coating can be prepared by homogeneously dissolving the components in a solvent such as trichloroethane, or toluene at a prescribed ratio.

When the material of the charge-generating material etc. to be used is not of a polymer, a matrix polymer may be added to the aforementioned composition as mentioned above.

The composition comprising the aforementioned components is dissolved in a suitable solvent and then coated on a conductive substrate in the same manner as explained above, thereby obtaining a drift mobility modulating element of this invention.

As for the film thickness of the recording layer, it may be suitably determined depending on the combination of these components. For example, the film thickness may be in the range of 0.1 to 500 μm.

In the drift mobility modulating element of this invention, any suitable conductive substrates such as explained with reference to the second embodiment can be used as a substrate for the drift mobility modulating element.

In the drift mobility modulating element of this invention, the writing and erasing of information can be performed in the same manner as explained above.

According to the drift mobility modulating element of this invention, the drift mobility in the recording layer comprising a charge-generating material, a charge-transporting material and a charge-capturing material can be modulated by the external energy, resulting in the change in conductivity of the recording layer. In this case, the quantum efficiency that is an amount of generated carrier per one photon can be made 1 or more. It is possible to bring about a change all over the recording layer, or at a portion of the recording layer. The retention time of this modulation may be altered depending on the combination of the components. If the retention time can be prolonged, the recording element can be applied to a memory, while if the retention time is short, the recording element can be applied to a switch. In any cases, the record of the application of external energy can be stored in the recording layer temporarily or for an extended period of time.

This invention will be further explained with reference to the following specific examples.

EXAMPLE I

In this example, the recording element of this invention was applied to a hologram file and the properties of the hologram file was evaluated.

(EXAMPLE I-1)

As a binder polymer, polycarbonate was employed and the components including a material of a charge-generating material etc. were added thereto to obtain a solution of 1,1,2-trichloroethane.

The amount of each component described below is an amount to that of polycarbonate.

| | |
|---|---|
| Charge-generating material: $C_{70}$ (ionization potential: 7.3 eV) | 3 wt % |
| Charge-transporting material: Pyrazoline derivative | 40 wt % |
| Charge-accepting material: Perylene (ionization potential: 6.29 eV) | 4 wt % |
| Light-absorber: 2-(N,N-dimethylamine)-5-nitroacetanilide | 30 wt % |

Light-absorber is a material having the electro-optic effect.

The solution thus obtained was coated over the surface of a glass sheet to a thickness of 1 mm, and then dried to obtain a film 200 μm in thickness.

Then, an object beam 632.8 nm in wavelength and a reference beam 632.8 nm in wavelength were irradiated from the opposite direction to each other, whereby preparing a volume hologram. It was possible to write a data of $10^6$ bit/cm$^2$ displayed on a page composer with a multiplicity of one hundred by angle-resolving, therefore a recording density of the recording element became $10^6$ bit/cm$^3$. This file could be reproduced after more than one month under a severe condition of 0° C.

(COMPARATIVE EXAMPLE I-1)

A conventional recording element provided with electrodes was prepared as explained below and evaluated characteristics of this recording element.

Specifically, at first a film having a thickness of 200 μm was formed with the same solution described in above Example I-1, and this film was sandwiched by two ITO electrodes serving as transparent electrode. Then a voltage of 200 V was applied to these electrodes.

An object light was irradiated to the electrode at an incident angle of 45° to write a data of $10^6$ bit/cm$^2$ on the recording element. At this time, an angle set up by the object light and the reference light was restricted within a range of 5° to 30°, so that multiplicity was only 5.

This means that multi-writing by angle-resolution is difficult due to the presence of electrodes. Meanwhile, when the angle set up by the object light and the reference light exceeded 30°, diffraction efficiency lowered to 0.7.

Accordingly a recording density as a volume hologram was $10^7$ bit/cm$^2$. This file could be reproduced only for one week under a severe condition of 0° C.

As seen from these experiments, the recording element according to the first embodiment of this invention which was provided with a recording layer whose optical properties could be changed only by the inner electric field could be used without requiring electrodes and exhibited a high recording capacity. It was also confirmed that the recording element according to the first embodiment of this invention was capable of reproducing for a long period of time.

EXAMPLE II

In this example, the influence of dipole moment of a charge-transporting material on the ratio (D/μ) between the diffusion coefficient (D) and the mobility (5) was studied and evaluated diffraction efficiency as an ability of an optical recording element.

(EXAMPLE II-1)

The dipole moment of oxadiazole derivative represented by the formula (a-1) shown below was measured according to the method described in an article set forth by Sugiuchi and Nishizawa (Journal of Imaging Science and Technology, Vol. 37, No. 3, pp 245 to 250, 1993). Namely, a plurality of solutions were prepared by dissolving an aimed compound in carbon tetrachloride at different concentrations respectively. The dipole moment was determined from the inclination of dielectric constant in relative to the molar fractions of the solutions and from the inclination of refractive index when the D line of sodium was used.

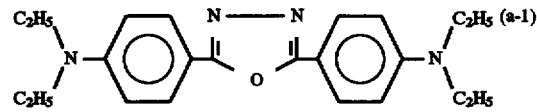

The dipole moment of the oxadiazole derivative thus measured according to the above procedures was 5.56 Debye.

Then, sample containing this compound was prepared to measure the mobility and diffusion coefficient. The samples employed for measuring the mobility and diffusion coefficient were prepared as explained below. First of all, the aforementioned oxadiazole derivative was mixed with bisphenol A type polycarbonate at a ratio of 2:1 (weight), and the resultant mixture was dissolved in trichloroethane to obtain a solution. The solution was then coated on the surface of a quartz substrate provided with a translucent aluminum electrode, and dried to obtain a film 15.7 μm in thickness. Subsequently, gold was vapor-deposited on the upper surface of the film to obtain a sample for measuring the mobility and diffusion coefficient.

The mobility and diffusion coefficient of the sample were measured by a method described in an article set forth by Hirao, Nishizawa and Sugiuchi (Physical Review Letters. Vol. 75, No. 9, pp 1787 to 1790, 1995). Namely, a positive potential was impressed on the aluminum electrode of the sample, while a resistance which was sufficiently low (1 KW) as compared with the sample was put on the gold thus setting it to 0V. Then, nitrogen laser 0.9 nanosecond in pulse width was irradiated from aluminum electrode to measure the transient photocurrent generated at this moment. Since the penetration depth of the nitrogen laser beam into the film was about 1/50 of the film thickness, the carrier was assumed to have been generated in a sheet-like form on the interface of the aluminum electrode. The transient photocurrent thus measured was then fitted in the following formula according to Monte Carlo analysis to obtain D/μ.

$$J = \frac{eD}{d} \frac{no}{\sqrt{4\pi Dt}} \left( \exp\left\{ -\frac{(d-vt)^2}{4Dt} \right\} - \exp\left\{ -\frac{(vt)^2}{4Dt} \right\} \right) - \frac{ev}{d} \frac{no}{2} \left( erf\left\{ \frac{vt}{\sqrt{4Dt}} \right\} + Flag\, erf\left\{ \frac{d-vt}{\sqrt{4Dt}} \right\} \right),$$

$$Flag = \begin{cases} 1, d \geq vt, \\ -1, d \leq vt, \end{cases}$$

wherein "e" and "d" are constants representing a charge elementary quantity and the thickness of the film respectively; "I" and "t" are valuables representing a current density and time respectively; "v", "D", and "no" are fitting parameters representing speed (=μE, "E" is an intensity of the electric field), diffusion coefficient and a number of carriers.

As a result, the value of the D/μ was found to be 42.3 under the electric field of 100 kV/cm².

The performance, as an optical recording medium, of the film containing the aforementioned compound was evaluated by forming a diffraction grating on this film and then measuring the diffraction efficiency.

To prepare a sample, the following four kinds of components were mixed and dissolved into methylene chloride to obtain a methylene chloride solution.

| Composition | Ratio (weight) |
|---|---|
| Charge-transporting material: Oxadiazole derivative (a-1) | 40 |
| Matrix polymer: Bisphenol A type polycarbonate | 20 |
| Charge-generating material: Titanylphthalocyanine fine particles | 8 |
| Recording material: 2-(N,N-dimethylamino)-5-nitroacetoanilide (DAN) | 32 |

The solution thus obtained was cast over the surface of a quartz substrate, and then dried to obtain a sample film 6 μm in film thickness.

In the followings, the method of forming a diffraction grating and the method of reproducing the diffraction grating will be explained. Referring to FIG. 4, a helium-neon laser beam was separated into an object beam 43 and a reference beam 45, and these beams were irradiated in such a manner that these beams intersect on the sample film 41 thereby to form a diffraction pattern on the sample film. The pattern thus formed was left for one hour and the writing was performed. At this occasion, due to the interference fringes that had been generated by the superimposition of the object beam 43 and the reference beam 45, an inner electric field was caused to generate, and the modulation of optical properties of the sample film was brought about, and hence a diffraction grating was formed on this recording medium.

Subsequently, the object beam 43 was cut off, and only the reference beam 45 was irradiated in the same manner as in the case of the writing to reproduce the written information. The reference beam 45 was diffracted by the recording medium into three components, i.e. a component of the reference beam 45, a component 46 directed in the opposite direction to the object beam and a component 44 directed in the penetrating direction of the object beam.

As seen from FIG. 4, a light-detecting device 47 for measuring the intensity of a reproduced beam was disposed in the passing direction 44 of the object beam. With this light-detecting device 47, the object beam which was not supposed to have been irradiated, i.e., a reproduced image could be observed, thus functioning as an optical memory.

Herein, the ratio between the intensity of the object beam that will be reproduced by the reference beam and the intensity of the reference beam was defined as a diffraction efficiency.

The diffraction efficiency of the sample film according to this example which was measured in accordance with the above procedures was found to be 5.2%.

(EXAMPLE II-2)

The dipole moment of pyrazoline derivative represented by the formula (a-2) shown below was measured in the same method as explained in Example II-1.

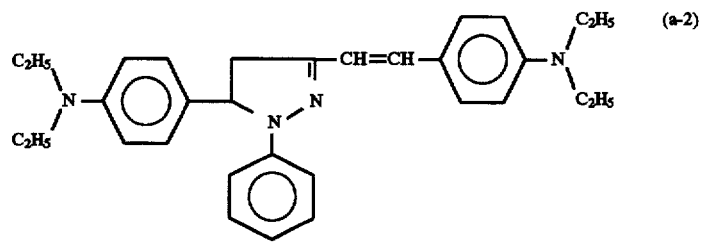

As a result, the dipole moment of the pyrazoline derivative thus measured was found to be 4.38 Debye.

Then, the same procedures as explained in Example II-1 were repeated except that oxadiazole derivative (a-1) was replaced by pyrazoline derivative (a-2) to obtain a trichloroethane solution. The solution was then coated on the surface of a substrate and dried to obtain a film 11.2 μm in thickness. Subsequently, gold was vapor-deposited on the upper surface of the film to obtain a sample for measuring the mobility and diffusion coefficient. As a result of the measurement, the D/μ was found to be 28.1.

Further, the same procedures as explained in Example II-1 were repeated except that oxadiazole derivative (a-1) was replaced by pyrazoline derivative (a-2) to obtain a methylene chloride solution. The methylene chloride solution thus obtained was cast over the surface of a quartz substrate, and then dried to obtain a sample film 6 μm in film thickness.

The diffraction efficiency of the sample film was measured in the same manner as explained above, and as a result the diffraction efficiency was found to be 2.1%.

(EXAMPLE II-3)

The dipole moment of hydrazone derivative represented by the formula (a-3) shown below was measured in the same method as explained in Example II-1.

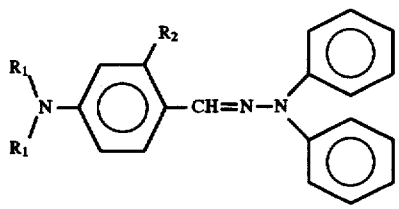

As a result, the dipole moment of the hydrazone derivative thus measured was found to be 3.97 Debye.

Then, the same procedures as explained in Example II-1 were repeated except that oxadiazole derivative (a-1) was replaced by hydrazone derivative (a-3) to obtain a trichloroethane solution. The solution was then coated on the surface of a substrate and dried to obtain a film 13.7 μm in thickness. Subsequently, gold was vapor-deposited on the upper surface of the film to obtain a sample for measuring the mobility and diffusion coefficient. As a result of the measurement, the D/μ was found to be 15.5.

Further, the same procedures as explained in Example II-1 were repeated except that oxadiazole derivative (a-1) was replaced by hydrazone derivative (a-3) to obtain a methylene chloride solution. The methylene chloride solution thus obtained was cast over the surface of a quartz substrate, and then dried to obtain a sample film 6 μm in film thickness.

The diffraction efficiency of the sample film was measured in the same manner as explained above, and as a result the diffraction efficiency was found to be 0.6%.

(COMPARATIVE EXAMPLE II-1)

The dipole moment of hydrazone derivative represented by the formula (a-4) shown below was measured in the same method as explained in Example II-1.

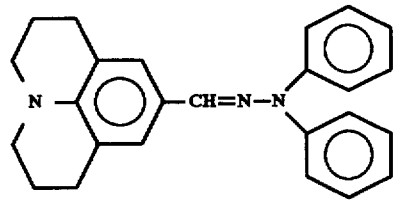

As a result, the dipole moment of the hydrazone derivative thus measured was found to be 3.31 Debye.

Then, the same procedures as explained in Example II-1 were repeated except that oxadiazole derivative (a-1) was replaced by hydrazone derivative (a-4) to obtain a trichloroethane solution. The solution was then coated on the surface of a substrate and dried to obtain a film 9.5 μm in thickness. Subsequently, gold was vapor-deposited on the upper surface of the film to obtain a sample for measuring the mobility and diffusion coefficient. As a result of the measurement, the D/μ was found to be 12.3.

Further, the same procedures as explained in Example II-1 were repeated except that oxadiazole derivative (a-1) was replaced by hydrazone derivative (a-4) to obtain a methylene chloride solution. The methylene chloride solution thus obtained was cast over the surface of a quartz substrate, and then dried to obtain a sample film 6 μm in film thickness.

The diffraction efficiency of the sample film was measured in the same manner as explained above, and as a result the diffraction efficiency was found to be 0.1% or less. This low diffraction efficiency is near the measurement limit so that there is a possibility of generating noise due to the precipitation of crystal.

(COMPARATIVE EXAMPLE II-2)

The dipole moment of hydrazone derivative represented by the formula (a-5) shown below was measured in the same method as explained in Example II-1.

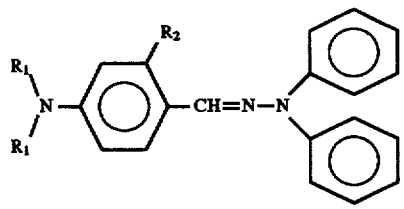

As a result, the dipole moment of the hydrazone derivative thus measured was found to be 3.13 Debye.

Then, the same procedures as explained in Example II-1 were repeated except that oxadiazole derivative (a-1) was replaced by hydrazone derivative (a-5) to obtain a trichloroethane solution. The solution was then coated on the surface of a substrate and dried to obtain a film 10.4 μm in thickness. Subsequently, gold was vapor-deposited on the upper surface of the film to obtain a sample for measuring the mobility and diffusion coefficient. As a result of the measurement, the D/μ was found to be 8.4.

Further, the same procedures as explained in Example II-1 were repeated except that oxadiazole derivative (a-1) was replaced by hydrazone derivative (a-5) to obtain a methylene chloride solution. The methylene chloride solution thus obtained was cast over the surface of a quartz substrate, and then dried to obtain a sample film 6 μm in film thickness.

The diffraction efficiency of the sample film was measured in the same manner as explained above, but the diffraction was not observed.

(Comparative Example II-3)

The dipole moment of triphenylamine derivative represented by the formula (a-6) shown below was measured in the same method as explained in Example II-1.

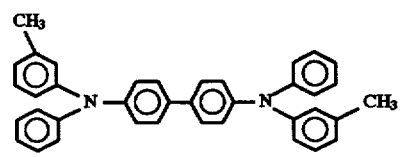

As a result, the dipole moment of the triphenylamine derivative thus measured was found to be 1.44 Debye.

Then, the same procedures as explained in Example II-1 were repeated except that oxadiazole derivative (a-1) was replaced by triphenylamine derivative (a-6) to obtain a trichloroethane solution. The solution was then coated on the surface of a substrate and dried to obtain a film 12.9 μm in thickness. Subsequently, gold was vapor-deposited on the upper surface of the film to obtain a sample for measuring the mobility and diffusion coefficient. As a result of the measurement, the D/μ was found to be 3.0.

Further, the same procedures as explained in Example II-1 were repeated except that oxadiazole derivative (a-1) was replaced by triphenylamine derivative (a-6) to obtain a methylene chloride solution. The methylene chloride solution thus obtained was cast over the surface of a quartz substrate, and then dried to obtain a sample film 6 μm in film thickness.

The diffraction efficiency of the sample film was measured in the same manner as explained above, but the diffraction was not observed.

Figure 8:
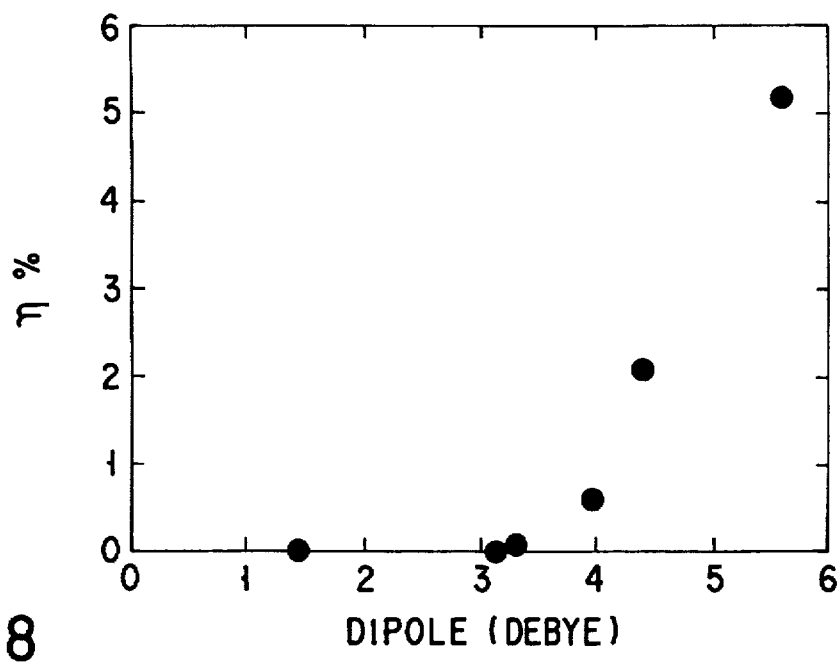
FIG. 8 shows the relationship between the electric dipole moment of an organic molecule and the diffraction efficiency of an optical recording medium using said organic molecule.

The results obtained from Examples (II-1) to (II-3) and Comparative Example (II-1) to (II-3) are summarized in FIGS. 6 to 8.

FIG. 6 illustrates a relationship between the dipole moment and the D/μ. As seen from the graph shown in FIG. 6, the larger the dipole moment is, the larger the D/μ becomes. FIG. 7 illustrates a relationship between the D/μ and the diffraction efficiency η. As seen from the graph shown in FIG. 7, the larger the D/μ is, the larger the diffraction efficiency becomes so that the performance of the recording element as an optical recording medium will be increasingly improved. FIG. 8 illustrates a relationship between the dipole moment and the diffraction efficiency η. As seen from the graph shown in FIG. 8, the performance of the recording element can be prominently improved when the value of dipole moment exceeds over 3.5 Debye.

EXAMPLE III

In this example, a recording element wherein information can be erased by the irradiation of light was prepared, and the performance thereof was evaluated. The followings are compounds employed in this Example III.

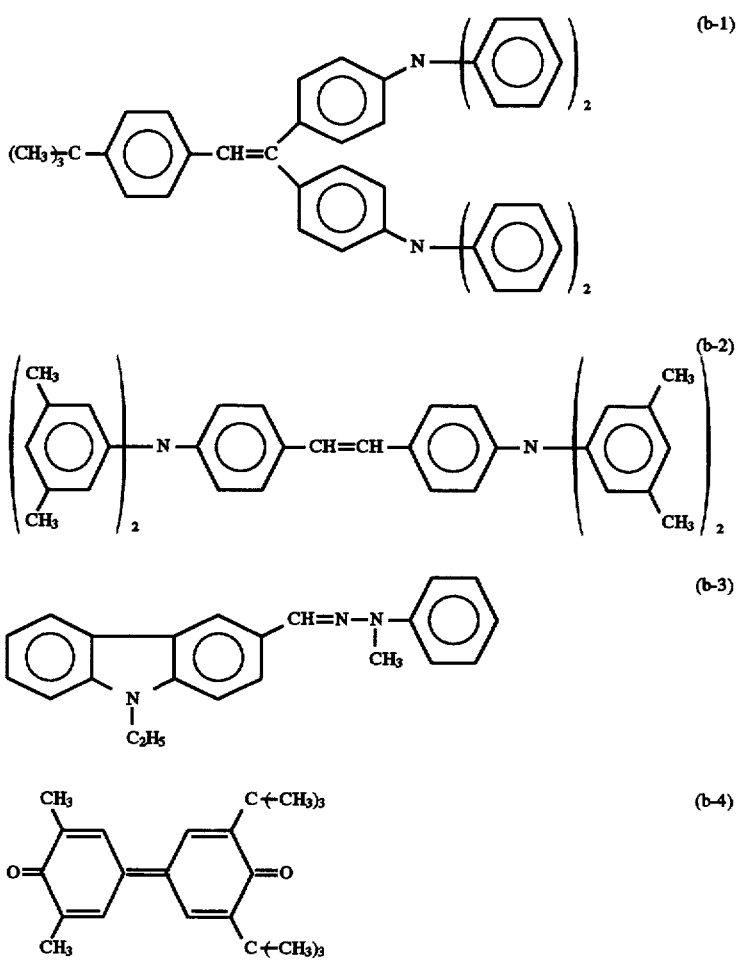

-continued
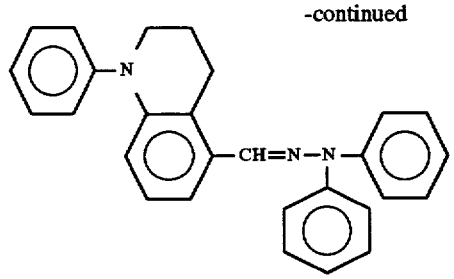
(b-5)
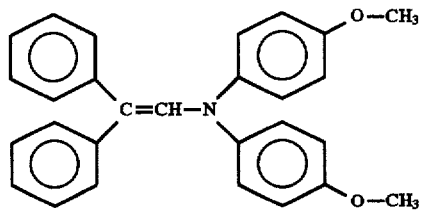
(b-6)
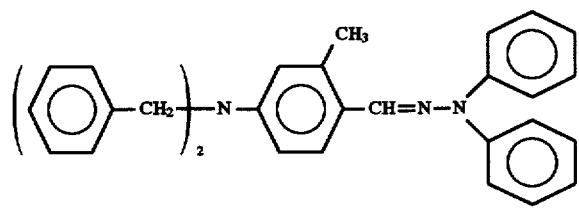
(b-7)
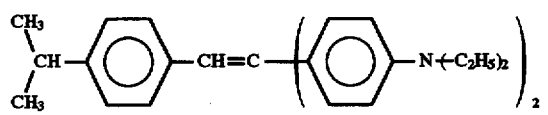
(b-8)
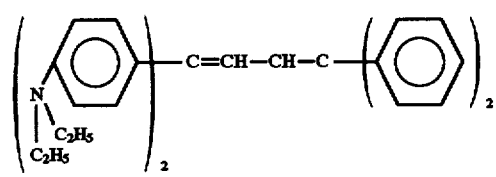
(b-9)
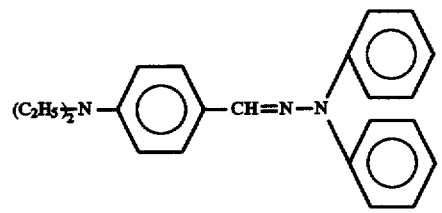
(b-10)
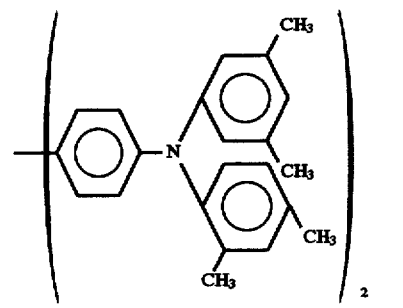
(b-11)
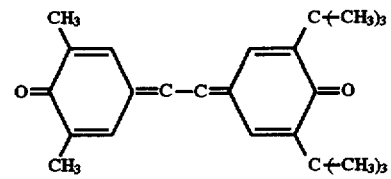
(b-12)

(EXAMPLE III-1)

Fine particles of fullerene comprising 98% or more of $C_{70}$ as a charge-generating material for writing, the compound (b-1) as a charge-transporting material, the compound (b-2) as a charge-capturing material, titanilephthalocyanine as a charge-generating material for erasing and methyl polymethacrylate as a binder polymer were respectively prepared, and mixed together at a ratio shown below to obtain a mixture, which was then dissolved into 10 ml of 1,1,2-trichloroethane.

| Composition | Ratio |
| --- | --- |
| Charge-generating material for writing: Fullerene particles comprising 98% or more of $C_{70}$ | 0.1 mg |
| Charge-transporting material: Compound (b-1) | 0.3 mg |
| Charge-accepting material: Compound (b-2) | 0.1 mg |
| Charge-generating material for erasing: Titanilephthalocyanine | 0.02 mg |
| Binder polymer: Methyl polymethacrylate | 4.96 mg |

In this composition, the ionization potential Ip(g) of the charge-generating material for writing was 7.30 eV; the ionization potential Ip(ct) of the charge-transporting material was 5.42 eV; and the ionization potential Ip(tr) of the charge-capturing material was 5.07 eV. Further, the electron affinity X(tr) of charge-capturing material was 1.94 eV; and the electron affinity X(e) of charge-generating material for erasing was 1.50 eV. Accordingly, they meet the following formulas.

$$Ip(g) > Ip(ct) > Ip(tr)$$

$$X(tr) > X(e)$$

The solution thus obtained was stirred by making use of a homogenizer until it became homogenous. Subsequently, the solution was filtered to remove foreign matters, and then dried and pulverized to powder.

Meanwhile, a glass plate was heated to 180° C., and the powder obtained above was put on the heated glass plate thereby dissolving the powder. Subsequently, a spacer 100 µm in diameter was put on the glass plate and pushed down onto the glass plate from the upper surface of the spacer. Then glass plate was placed in a vacuum drying apparatus and dried over 6 hours to prepare a sample.

The sample thus obtained was evaluated regarding its properties as follows. Namely, the sample was fixed on a holder, and irradiated in the following manner with a laser beam of 488 nm in wavelength. Namely, a pair of laser beams were irradiated onto the sample from two different forward directions so as to be intersect to each other on the sample thereby forming a diffraction grating pattern on the sample. Then the diffraction grating pattern was examined if it can be written. When the diffraction efficiency of the pattern was calculated by measuring the intensity of the reading light beam, the diffraction efficiency was found to be $5 \times 10^{-3}$. It was possible to read out this data for about 7 days. It was also possible to erase the data by irradiating a light from a xenon lamp, the wavelength thereof falling in a range of 600 nm or less being cut off in advance.

Then, the performance as a recording element of the sample was evaluated. Namely, the evaluation was performed by writing information en bloc on the entire surface of the element, and then read out at once the information thus written. The element employed in this case was shaped of a three-dimensional coordinates (X=50 mm, Y=50 mm, Z=50 mm), each being rectangular to each other. A liquid crystal element (area: 50 mm×50 mm) constituting a spatial light modulation element was disposed in parallel with the X-Y plane of the recording element, and a CCD was also disposed in parallel with the X-Y plane but in opposite to the liquid crystal element with the recording element being interposed therebetween.

Argon ion laser 488 nm in wavelength was employed as a writing light and the writing was performed as follows. The laser beam was separated into two beams by way of a beam splitter, one of the beams being employed as a reference beam, and the other being employed as an object beam. Meanwhile, an image data digitized in advance was input into the liquid crystal constituting an image display element and was displayed thereon. Then, the object beam expanded in advance to a parallel light 70 mm in diameter by way of a beam expander was irradiated onto this liquid crystal, and the transmitted beam therefrom was irradiated onto the recording element.

At this moment, a reference beam which had been expanded in advance to a parallel light 70 mm in diameter by way of a beam expander was irradiated onto the recording element at an angle of 45° to the Z-axis. The time required for this writing was 30 seconds.

It was possible to perform the reading of the information via the CCD element by irradiating a reference beam under the same conditions as in the case of the writing. The reading of the information (data) was possible for a time period of 7 days as in the case of the evaluation of the properties mentioned above. Moreover, it was also possible to perform the writing by changing the angle of beam every 0.05 degree, hence to perform a multiple recording.

When the surface of the recording element was scanned with an He-Ne laser, it was possible to selectively erase only the recorded portion as desired.

(EXAMPLE III-2)

Samples were prepared by repeating the same procedures as described in Example III-1 except that a composition shown below was dissolved into 10 ml of 1,1,2-trichloroethane.

| Composition | Ratio |
| --- | --- |
| Charge-generating material for writing: Fullerene particles comprising 98% or more of $C_{70}$ | 0.1 mg |
| Charge-transporting material: Compound (b-1) | 0.3 mg |
| Charge-accepting material: Compound (b-2) | 0.1 mg |
| Charge-generating material for erasing: Titanilephthalocyanine | 0.02 mg |
| Charge-transporting material for erasing: Compound (b-4) | 0.3 mg |
| Binder polymer: Methyl polymethacrylate | 4.96 mg |

In this composition, the ionization potential Ip(g) of the charge-generating material for writing was 7.30 eV; the ionization potential Ip(ct) of the charge-transporting material was 5.42 eV; and the ionization potential Ip(tr) of the charge-capturing material was 5.07 eV. Further, the electron affinity X(tr) of charge-capturing material was 1.94 eV; the electron affinity X(e) of charge-generating material for erasing was 1.50 eV; and the electron affinity X(rt) of charge-transporting material for erasing was 1.52 eV. Accordingly, they meet the following formulas.

$$Ip(g) > Ip(ct) > Ip(tr)$$

$$X(tr) > X(rt) > X(e)$$

The recording element thus obtained was evaluated regarding its properties as follows. Namely, the sample was fixed on a holder, and the writing and reading were performed in the same manner as explained in Example III-1 to measure the diffraction efficiency. As a result, the diffraction efficiency was found to be $6\times10^{-3}$. It was possible to read out this data for about two weeks. It was also possible to erase the data by irradiating a light from a xenon lamp, the wavelength thereof falling in a range of 700 nm or less being cut off in advance.

Then, the performance as a recording element of the sample was evaluated. Namely, the writing of information was performed by scanning a polygon mirror on the entire surface of the element, and the reading of the information thus written was performed at once by irradiating a reference beam on the written record. The element employed in this case was shaped of a three-dimensional coordinates (X=50 mm, Y=50 mm, Z=50 mm), each being rectangular to each other. A laser beam scanning device was disposed in parallel with the X-Y plane of the recording element, and a CCD was also disposed in parallel with the X-Y plane but in opposite to the laser beam scanning device with the recording element being interposed therebetween.

Argon ion laser 488 nm in wavelength was employed as a writing light and the writing was performed as follows. The laser beam was separated into two beams by way of a beam splitter, one of the beams being employed as a reference beam, and the other being employed as an object beam. First, a bit data of an image Fourier-transformed in advance was written into the recording element by making use of a laser beam.

Then, the object beam expanded in advance to a parallel light 70 mm in diameter by way of a beam expander was irradiated onto the recording element from the direction of the laser operating apparatus. As a result, it was possible to perform the reading of the information via the CCD. The reading of the information (data) was possible for a time period of two weeks as in the case of the evaluation of the properties mentioned above.

(EXAMPLE III-3)

Samples were prepared by repeating the same procedures as described in Example III-1 except that a composition shown below was dissolved into 10 ml of 1,1,2-trichloroethane.

| Composition | Ratio |
|---|---|
| Charge-generating material for writing: Fullerene particles comprising 98% or more of $C_{70}$ | 0.02 mg |
| Charge-transporting material: Compound (b-1) | 0.3 mg |
| Charge-accepting material: Compound (b-5) | 1.0 mg |
| Charge-generating material for erasing: Titanilephthalocyanine | 0.02 mg |
| Charge-transporting material for erasing: Compound (b-4) | 0.3 mg |
| Binder polymer: Methyl polymethacrylate | 4.96 mg |

In this composition, the ionization potential Ip(g) of the charge-generating material for writing was 7.30 eV; the ionization potential Ip(ct) of the charge-transporting material was 5.42 eV; and the ionization potential Ip(tr) of the charge-capturing material was 5.02 eV. Further, the electron affinity X(tr) of charge-capturing material was 1.65 eV; the electron affinity X(e) of charge-generating material for erasing was 1.50 eV; and the electron affinity X(rt) of charge-transporting material for erasing was 1.52 eV. Accordingly, they meet the following formulas.

$$Ip(g) > Ip(ct) > Ip(tr)$$

$$X(tr) > X(rt) > X(e)$$

Then, the sample was fixed on a holder, and the writing and reading were performed in the same manner as explained in Example III-1 to measure the diffraction efficiency. As a result, the diffraction efficiency was found to be $6\times10^{-3}$. It was possible to read out this data for about 5 weeks. It was also possible to erase the data by irradiating a light from a xenon lamp, the wavelength thereof falling in a range of 700 nm or less being cut off in advance.

(EXAMPLE III-4)

Samples were prepared by repeating the same procedures as described in Example III-1 except that a composition shown below was dissolved into 10 ml of 1,1,2-trichloroethane.

| Composition | Ratio |
|---|---|
| Charge-generating material for writing: Fullerene particles comprising 98% or more of $C_{70}$ | 0.02 mg |
| Charge-transporting material: Compound (b-1) | 0.3 mg |
| Charge-accepting material: Compound (b-6) | 1.0 mg |
| Charge-generating material for erasing: Titanilephthalocyanine | 0.02 mg |
| Charge-transporting material for erasing: Compound (b-4) | 0.3 mg |
| Binder polymer: Methyl polymethacrylate | 4.96 mg |

In this composition, the ionization potential Ip(g) of the charge-generating material for writing was 7.30 eV; the ionization potential Ip(ct) of the charge-transporting material was 5.42 eV; and the ionization potential Ip(tr) of the charge-capturing material was 5.01 eV. Further, the electron affinity X(tr) of charge-capturing material was 1.96 eV; the electron affinity X(e) of charge-generating material for erasing was 1.50 eV; and the electron affinity X(rt) of charge-transporting material for erasing was 1.52 eV. The energy distribution width σ(ct) of the charge-transporting material for writing was 0.12 eV and the energy distribution width σ(tr) of the charge-capturing material was 0.15 eV. Accordingly, they meet the following formulas.

$$Ip(g) > Ip(ct) - \sigma(ct) > Ip(tr) + \sigma(tr)$$

$$X(tr) > X(e)$$

Then, the sample was fixed on a holder, and the writing and reading were performed in the same manner as explained in Example III-1 to measure the diffraction efficiency. As a result, the diffraction efficiency was found to be $7\times10^{-3}$. It was possible to read out this data for about 3 months. It was also possible to erase the data by irradiating a light from a xenon lamp, the wavelength thereof falling in a range of 700 nm or less being cut off in advance.

(EXAMPLE III-5)

Samples were prepared by repeating the same procedures as described in Example III-1 except that a composition shown below was dissolved into 10 ml of 1,1,2-trichloroethane.

| Composition | Ratio |
| --- | --- |
| Charge-generating material for writing: Fullerene particles comprising 98% or more of $C_{70}$ | 0.02 mg |
| Charge-transporting material: Compound (b-1) | 0.3 mg |
| Charge-accepting material: Compound (b-7) | 1.0 mg |
| Charge-generating material for erasing: Titanilephthalocyanine | 0.02 mg |
| Charge-transporting material for erasing: Compound (b-4) | 0.3 mg |
| Binder polymer: Methyl polymethacrylate | 4.96 mg |

In this composition, the ionization potential Ip(g) of the charge-generating material for writing was 7.30 eV; the ionization potential Ip(ct) of the charge-transporting material was 5.42 eV; and the ionization potential Ip(tr) of the charge-capturing material was 4.92 eV. Further, the electron affinity X(tr) of charge-capturing material was 1.54 eV; the electron affinity X(e) of charge-generating material for erasing was 1.50 eV; and the electron affinity X(rt) of charge-transporting material for erasing was 1.52 eV. Accordingly, they meet the following formulas.

Ip(g)>Ip(ct)>Ip(tr)

X(tr)>X(rt)>X(e)

Then, the sample was fixed on a holder, and the writing and reading were performed in the same manner as explained in Example III-1 to measure the diffraction efficiency. As a result, the diffraction efficiency was found to be $7 \times 10^{-3}$. It was possible to read out this data for about 6 months. It was also possible to erase the data by irradiating a light from a xenon lamp, the wavelength thereof falling in a range of 700 nm or less being cut off in advance.

(EXAMPLE III-6)

Samples were prepared by repeating the same procedures as described in Example III-1 except that a composition shown below was dissolved into 10 ml of 1,1,2-trichloroethane.

| Composition | Ratio |
| --- | --- |
| Charge-generating material for writing: Fullerene particles comprising 98% or more of $C_{70}$ | 0.02 mg |
| Charge-transporting material: Compound (b-1) | 0.3 mg |
| Charge-accepting material: Compound (b-8) | 1.0 mg |
| Charge-generating material for erasing: Titanilephthalocyanine | 0.02 mg |
| Charge-transporting material for erasing: Compound (b-4) | 0.3 mg |
| Binder polymer: Methyl polymethacrylate | 4.96 mg |

In this composition, the ionization potential Ip(g) of the charge-generating material for writing was 7.30 eV; the ionization potential Ip(ct) of the charge-transporting material was 5.42 eV; and the ionization potential Ip(tr) of the charge-capturing material was 4.88 eV. Further, the electron affinity X(tr) of charge-capturing material was 1.53 eV; the electron affinity X(e) of charge-generating material for erasing was 1.50 eV; and the electron affinity X(rt) of charge-transporting material for erasing was 1.52 eV. Accordingly, they meet the following formulas.

Ip(g)>Ip(ct)>Ip(tr)

X(tr)>X(rt)>X(e)

Then, the sample was fixed on a holder, and the writing and reading were performed in the same manner as explained in Example III-1 to measure the diffraction efficiency. As a result, the diffraction efficiency was found to be $8 \times 10^{-3}$. It was possible to read out this data for about one year. It was also possible to erase the data by irradiating a light from a xenon lamp, the wavelength thereof falling in a range of 700 nm or less being cut off in advance.

(EXAMPLE III-7)

Samples were prepared by repeating the same procedures as described in Example III-1 except that a composition shown below was dissolved into 10 ml of 1,1,2-trichloroethane.

| Composition | Ratio |
| --- | --- |
| Charge-generating material for writing: Fullerene particles comprising 98% or more of $C_{70}$ | 0.02 mg |
| Charge-transporting material: Compound (b-1) | 0.3 mg |
| Charge-accepting material: Compound (b-9) | 1.0 mg |
| Charge-generating material for erasing: Tetrachloroindigo | 0.02 mg |
| Charge-transporting material for erasing: Compound (b-4) | 0.3 mg |
| Binder polymer: Methyl polymethacrylate | 4.96 mg |

In this composition, the ionization potential Ip(g) of the charge-generating material for writing was 7.30 eV; the ionization potential Ip(ct) of the charge-transporting material was 5.42 eV; and the ionization potential Ip(tr) of the charge-capturing material was 4.80 eV. Further, the electron affinity X(tr) of charge-capturing material was 1.70 eV; the electron affinity X(e) of charge-generating material for erasing was 1.50 eV; and the electron affinity X(rt) of charge-transporting material for erasing was 1.52 eV. Accordingly, they meet the following formulas.

Ip(g)>Ip(ct)>Ip(tr)

X(tr)>X(rt)>X(e)

Then, the sample was fixed on a holder, and the writing and reading were performed in the same manner as explained in Example III-1 to measure the diffraction efficiency. As a result, the diffraction efficiency was found to be $9 \times 10^{-3}$. It was possible to read out this data for about three years. It was also possible to erase the data by irradiating a light from a xenon lamp, the wavelength thereof falling in a range of 700 nm or less being cut off in advance.

(EXAMPLE III-8)

Samples were prepared by repeating the same procedures as described in Example III-1 except that a composition shown below was dissolved into 10 ml of 1,1,2-trichloroethane.

| Composition | Ratio |
| --- | --- |
| Charge-generating material for writing: Fullerene particles comprising 98% or more of $C_{70}$ | 0.02 mg |
| Charge-transporting material: Compound (b-1) | 0.3 mg |
| Charge-accepting material: Compound (b-10) | 1.0 mg |
| Charge-generating material for erasing: Tetrachloroindigo | 0.02 mg |
| Charge-transporting material for erasing: Compound (b-4) | 0.3 mg |

-continued

| Composition | Ratio |
|---|---|
| Binder polymer: Methyl polymethacrylate | 4.96 mg |

In this composition, the ionization potential Ip(g) of the charge-generating material for writing was 7.30 eV; the ionization potential Ip(ct) of the charge-transporting material was 5.42 eV; and the ionization potential Ip(tr) of the charge-capturing material was 4.92 eV. Further, the electron affinity X(tr) of charge-capturing material was 1.85 eV; the electron affinity X(e) of charge-generating material for erasing was 1.50 eV; and the electron affinity X(rt) of charge-transporting material for erasing was 1.52 eV. Accordingly, they meet the following formulas.

$$Ip(g) > Ip(ct) > Ip(tr)$$

$$x(tr) > X(rt) > X(e)$$

Then, the sample was fixed on a holder, and the writing and reading were performed in the same manner as explained in Example III-1 to measure the diffraction efficiency. As a result, the diffraction efficiency was found to be $9 \times 10^{-3}$. It was found possible, through an accelerated test, to read out this data for about ten years. It was also possible to erase the data by irradiating a light from a xenon lamp, the wavelength thereof falling in a range of 700 nm or less being cut off in advance.

(COMPARATIVE EXAMPLE III-1)

Samples were prepared by repeating the same procedures as described in Example III-1 except that a composition shown below was dissolved into 10 ml of 1,1,2-trichloroethane.

| Composition | Ratio |
|---|---|
| Charge-generating material for writing: Fullerene particles comprising 98% or more of $C_{70}$ | 0.02 mg |
| Charge-transporting material: Compound (b-1) | 0.3 mg |
| Charge-accepting material: Compound (b-10) | 1.0 mg |
| Charge-generating material for erasing: Magnesium phthalocyanine | 0.02 mg |
| Charge-transporting material for erasing: Compound (b-4) | 0.3 mg |
| Binder polymer: Methyl polymethacrylate | 4.96 mg |

In this composition, the ionization potential Ip(g) of the charge-generating material for writing was 7.30 eV; the ionization potential Ip(ct) of the charge-transporting material was 5.42 eV; and the ionization potential Ip(tr) of the charge-capturing material was 4.92 eV. Further, the electron affinity X(tr) of charge-capturing material was 1.85 eV; the electron affinity X(e) of charge-generating material for erasing was 2.80 eV; and the electron affinity X(rt) of charge-transporting material for erasing was 1.52 eV. Accordingly, they does not meet the following formulas.

$$Ip(g) > Ip(ct) > Ip(tr)$$

$$X(tr) > X(rt) > X(e)$$

Then, the sample was fixed on a holder, and the writing and reading were performed in the same manner as explained in Example III-1 to measure the diffraction efficiency. As a result, the diffraction efficiency was found to be $9 \times 10^{-3}$. It was found possible, through an accelerated test, to read out this data for about ten years. However, it was impossible to erase the data even if a light from a xenon lamp whose wavelength falling in a range of 700 nm or less was cut off in advance was irradiated thereon.

(EXAMPLE III-9)

Samples were prepared by repeating the same procedures as described in Example III-1 except that a composition shown below was dissolved into 10 ml of 1,1,2-trichloroethane.

| Composition | Ratio |
|---|---|
| Charge-generating material for writing: Fullerene particles comprising 98% or more of $C_{70}$ | 0.02 mg |
| Charge-transporting material: Compound (b-11) | 0.3 mg |
| Charge-accepting material: Compound (b-10) | 1.0 mg |
| Charge-generating material for erasing: Tetrachloroindigo | 0.02 mg |
| Charge-transporting material for erasing: Compound (b-12) | 0.3 mg |
| Binder polymer: Methyl polymethacrylate | 4.96 mg |

In this composition, the ionization potential Ip(g) of the charge-generating material for writing was 7.30 eV; the ionization potential Ip(ct) of the charge-transporting material was 5.18 eV; and the ionization potential Ip(tr) of the charge-capturing material was 4.80 eV. Further, the electron affinity X(tr) of charge-capturing material was 1.85 eV; the electron affinity X(e) of charge-generating material for erasing was 1.50 eV; and the electron affinity X(rt) of charge-transporting material for erasing was 1.60 eV. Accordingly, they meet the following formulas.

$$Ip(g) > Ip(ct) > Ip(tr)$$

$$X(tr) > X(rt) > X(e)$$

Then, the sample was fixed on a holder, and the writing and reading were performed in the same manner as explained in Example III-1 to measure the diffraction efficiency. As a result, the diffraction efficiency was found to be $5 \times 10^{-2}$. It was found possible, through an accelerated test, to read out this data for about ten years. It was also possible to erase the data by irradiating a light from a xenon lamp, the wavelength thereof falling in a range of 700 nm or less being cut off in advance.

(EXAMPLE III-10)

Samples were prepared by repeating the same procedures as described in Example III-1 except that a composition shown below was dissolved into 10 ml of 1,1,2-trichloroethane.

| Composition | Ratio |
|---|---|
| Charge-generating material for writing: Fullerene particles comprising 98% or more of $C_{60}$ | 0.02 mg |
| Charge-transporting material: Compound (b-11) | 0.3 mg |
| Charge-accepting material: Compound (b-10) | 1.0 mg |
| Charge-generating material for erasing: Tetrachloroindigo | 0.02 mg |
| Charge-transporting material for erasing: Compound (b-12) | 0.3 mg |
| Binder polymer: Methyl polymethacrylate | 4.96 mg |

In this composition, the ionization potential Ip(g) of the charge-generating material for writing was 7.30 eV; the ionization potential Ip(ct) of the charge-transporting material was 5.18 eV; and the ionization potential Ip(tr) of the charge-capturing material was 4.80 eV. Further, the electron affinity X(tr) of charge-capturing material was 1.85 eV; the electron affinity X(e) of charge-generating material for erasing was 1.50 eV; and the electron affinity X(rt) of charge-transporting material for erasing was 1.62 eV. Accordingly, they meet the following formulas.

Ip(g)>Ip(ct)>Ip(tr)

X(tr)>X(rt)>X(e)

Then, the sample was fixed on a holder, and the writing and reading were performed in the same manner as explained in Example III-1 to measure the diffraction efficiency. As a result, the diffraction efficiency was found to be $1 \times 10^{-2}$. It was found possible, through an accelerated test, to read out this data for about ten years. It was also possible to erase the data by irradiating a light from a xenon lamp, the wavelength thereof falling in a range of 700 nm or less being cut off in advance.

In the above Example III, a charge-generating material for erasing was additionally incorporated into the recording layer, and at the same time the relationships among these components with respect to the ionization potential as well as the electron affinity were suitably selected. Therefore, it was possible to provide an optical recording medium which is capable of easily recording, through the irradiation of light, information or data in high density and, at the same time, capable of erasing the information or data recorded therein.

EXAMPLE IV

In this example, a recording element exhibiting an excellent bistability was prepared by incorporating a compound which can be ionized or has a capability of increasing dipole moment by the application of an external energy into the recording layer.

(EXAMPLE IV-1)

Figure 9:
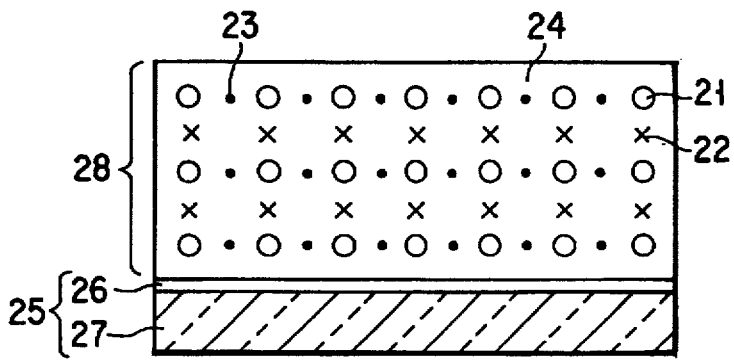
FIG. 9 is a sectional view schematically showing another embodiment of recording element according to this invention.

FIG. 9 illustrates schematically showing one embodiment of the recording element of this Example.

Referring to FIG. 9, this recording element is substantially constituted by an electrode substrate 25 formed of a transparent substrate 27 on which a transparent electrode 26 is vapor-deposited; and by a recording layer 28 formed on the electrode substrate 25. This recording layer 28 is substantially consisted of a composition comprising a chromic material 23, a matrix polymer 24, a charge-generating material 21 and a hole-transporting material 22. This composition was prepared by the following procedures.

High purity $C_{70}$ as a charge-generating material for writing 21; N,N'-diphenyl-N,N'-bis(3-methylphenyl)(1,1'-biphenyl)-4,4'-diamine (TPD) as a hole-transporting material 22; 6'-hydroxyspirobenzospiropyran (SP), which is a chromic compound, as a recording material 23; and polystyrene as a matrix polymer 24 were respectively prepared and mixed together at a ratio shown below to obtain a mixture, which was then dissolved in toluene to obtain a toluene solution.

| Composition | Weight ratio |
| --- | --- |
| Charge-transporting material: $C_{70}$ | 1 |
| Hole-transporting material: | 25 |

| Composition | Weight ratio |
| --- | --- |
| N,N'-diphenyl-N,N'-bis(3-methylphenyl)-(1,1'-biphenyl)-4,4'-diamine (TPD) | |
| Recording material: 6'-hydroxyspirobenzospiropyran (SP) | 9 |
| Matrix polymer: Polystyrene | 65 |

The electrode substrate 25 was prepared by vapor-depositing a transparent electrode consisting of indium oxide (ITO) on a transparent substrate. Then, a toluene solution was dripped on the electrode substrate 25 and sufficiently dried at room temperature and 60° C., thereby preparing a thin film of charge-generating composition 20 μm in film thickness.

Then, a laser beam 488.0 nm in wavelength was irradiated on the thin film of charge-generating composition by making use of Ar laser beam of 1 mW, thereby optically exciting the $C_{70}$ dispersed in the thin film to generate electric charge in the thin film. At this moment, the electric charge thus generated was allowed to hop between the hole-transporting materials and after being transferred to a little distance away to be trapped therein. As a result, an inner electric field was caused to generate between the charge trapped in this manner and the charge of opposite sign that had been failed to transfer.

Then, a laser beam 337 nm in wavelength was irradiated on the thin film by making use of $N_2$ laser beam of 1 mW, thereby causing the opening of ring (intermolecular polarization) of SP thus developing color and at the same time fixing the polarized state of the charge by the inner electric field in the thin film, and hence recording the information.

When the recording element keeping the information therein was put on a hot plate heated to 80° C., the information was instantaneously erased.

(EXAMPLE IV-2)

Figure 10:
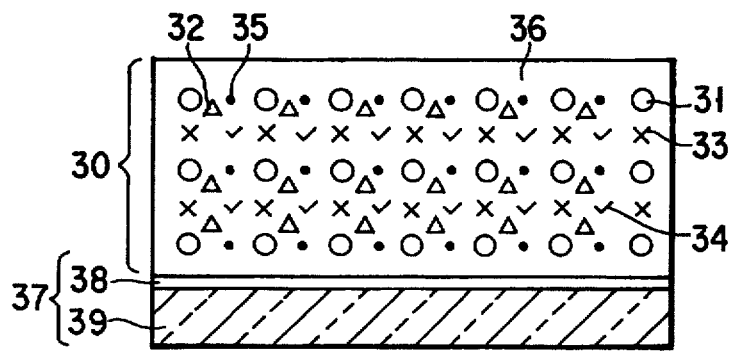
FIG. 10 is a sectional view schematically showing still another embodiment of recording element according to this invention.

FIG. 10 illustrates schematically showing another embodiment of the recording element of this Example.

Referring to FIG. 10, this recording element is substantially constituted by an electrode substrate 37 formed of a transparent substrate 39 on which a transparent electrode 38 is vapor-deposited; and by a recording layer 30 formed on the electrode substrate 37. This recording layer 30 is substantially consisted of a composition comprising a chromic material 35, a matrix polymer 36, charge-generating materials 31, 32, a hole-transporting material 33 and an electron-transporting material 34. This composition was prepared by the following procedures.

High purity $C_{70}$ and an X-type phthalocyanine as charge-generating materials 31 and 32; N,N'-diphenyl-N,N'-bis(3-methylphenyl)-(1,1'-biphenyl)-4,4'-diamine (TPD) as a hole-transporting material 33; tetracyanoquinodimethane (TCNQ) as an electron-transporting material 34; 6'-hydroxyspirobenzospiropyran (SP), which is a chromic compound, as a recording material 35; and polystyrene as a matrix polymer 36 were respectively prepared and mixed together at a ratio shown below to obtain a mixture, which was then dissolved in toluene to obtain a toluene solution.

| Composition | Weight ratio |
| --- | --- |
| Charge-transporting material: $C_{70}$ | 1 |
| Charge-generating material: X-type phthalocyanine | 1 |
| Hole-transporting material: N,N'-diphenyl-N,N'-bis(3-methylphenyl)-(1,1'-biphenyl)-4,4'-diamine (TPD) | 25 |
| Electron-transporting material: Tetracyanoquinodimethane (TCNQ) | 25 |
| Recording material: 6'-hydroxyspirobenzospiropyran (SP) | 8 |
| Matrix polymer: Polystyrene | 40 |

The electrode substrate 37 was prepared by vapor-depositing a transparent electrode consisting of indium oxide (ITO) on a transparent substrate. Then, a toluene solution was dripped on the electrode substrate 25 and sufficiently dried at room temperature and 60° C., thereby preparing a thin film of charge-generating composition 25 μm in film thickness. At this moment, the X-type phthalocyanine was dispersed as a pigment in the matrix polymer, and all of other compounds were dispersed in the form of molecule. The determination of whether a compound was dispersed in the form of pigment or molecule could be performed by an X-rays diffraction method or by an ultra-violet ray visible absorption spectrometry.

Then, a laser beam 488.0 nm in wavelength was irradiated on the thin film of charge-generating composition by making use of Ar laser beam of 1 mW, thereby optically exciting the $C_{70}$ dispersed in the thin film to generate electric charge in the thin film. At this moment, the electric charge thus generated was allowed to hop between the hole-transporting materials and after being transferred to a little distance away to be trapped therein. As a result, an inner electric field was caused to generate between the charge trapped in this manner and the charge of opposite sign that had been failed to transfer.

Then, a laser beam 337 nm in wavelength was irradiated on the thin film by making use of $N_2$ laser beam of 1 mW, thereby causing the opening of ring (intramolecular polarization) of SP thus developing color and at the same time fixing the polarized state of the charge by the inner electric field in the thin film, and hence recording the information.

The recording element keeping the information therein was instantaneously erased by allowing the X-type phthalocyanine to be irradiated by a laser beam of 780 nm generated from a GaAlAs laser, i.e. the erasing of the information was effected by allowing the inner electric field to be eliminated by the negative charge generated by the irradiation of the laser beam. Alternatively, the recording element keeping the information therein was put on a hot plate heated to 80° C., thereby instantaneously erasing the information.

As explained above, it is possible to manufacture a recording element excellent in bistability even from a recording material which is inherently poor in bistability by adopting the measures, wherein an inner electric field is caused to generate at very small region in the matrix polymer by the irradiation of light onto a conductive substrate, and at the same time a recording material is ionized or the dipole moment thereof is enhanced by the application of an external energy, the resultant state of the recording material being fixed by the aforementioned inner electric field.

EXAMPLE V

In this example, a photo-sensitive body was prepared as a drift mobility-modulating element, and the properties thereof were evaluated.

(EXAMPLE V-1)

First, a substrate was prepared as follows. A polyester film (240 mm×200 mm) 100 μm in film thickness was employed and a gold layer was formed on the both surfaces of the substrate in such a manner that the resultant surface resistance becomes 500 W. Subsequently, the both longer sides of the substrate were superimposed to fusion-adhere them, thereby obtaining a cylinder 240 mm in length and 60 mm in diameter. A recording layer was then formed on the outer surface of this cylinder thereby obtaining a recording element of this invention.

Meanwhile, a mixture comprising 1 part by weight of a carrier-transporting molecule (ionized potential: about 5.3 eV) formed of the compound (c-1) shown below and 1 part by weight of polyvinylcarbazole (ionized potential: about 5.9 eV) as a charge-capturing material was dissolved into 1,1,2-trichloroethane to obtain a homogenous solution.

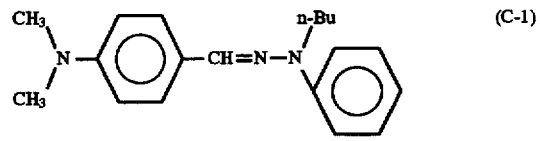

Then, 0.5 parts by weight based on polyvinylcarbazole of fullerene comprising 80% or more of $C_{70}$ as a charge-generating material (ionized potential: about 7.3 eV) was added to the aforementioned solution, and homogeneously mixed. The above addition of fullerene was performed together with the addition of 10 wt % of polyvinylcarbazole.

The solution thus obtained was coated on the outer surface of the aforementioned cylindrical body to form a layer having a thickness of 5 μm (dry), whereby obtaining a photo-sensitive body.

The photo-sensitive body thus prepared was built in an electrophotographic printer of back-exposure type, and a light source was inserted into the inner side of the photo-sensitive cylindrical body. When a data was written on this photosensitive body for the first time by applying a light irradiation for data-writing (550 nm, 3.6 μm, 1 sec), the ratio between the charge mobility at the irradiated portion and the charge mobility at the non-irradiated portion ($2.5 \times 10^4 / 2.1 \times 10^{-6}$) was found to be about 120.

Then, the procedures of electrification, development and transcription were repeated 100 times on this photosensitive body thereby obtaining 100 pieces of images. Then, this photosensitive body was heated to 80° C. to erase the data. As a result, the ratio between the charge mobility at the irradiated portion and the charge mobility at the non-irradiated portion was decreased to 1.

Subsequently, a new data was written on this photosensitive body, and the same procedures as mentioned above were repeated to obtain 100 sheets of images. The ratio between the charge mobility at the irradiated portion and the charge mobility at the non-irradiated portion at this occasion was also about 120. The images of 200 sheets were all comparable to the initial image of the first output.

Figure 11:
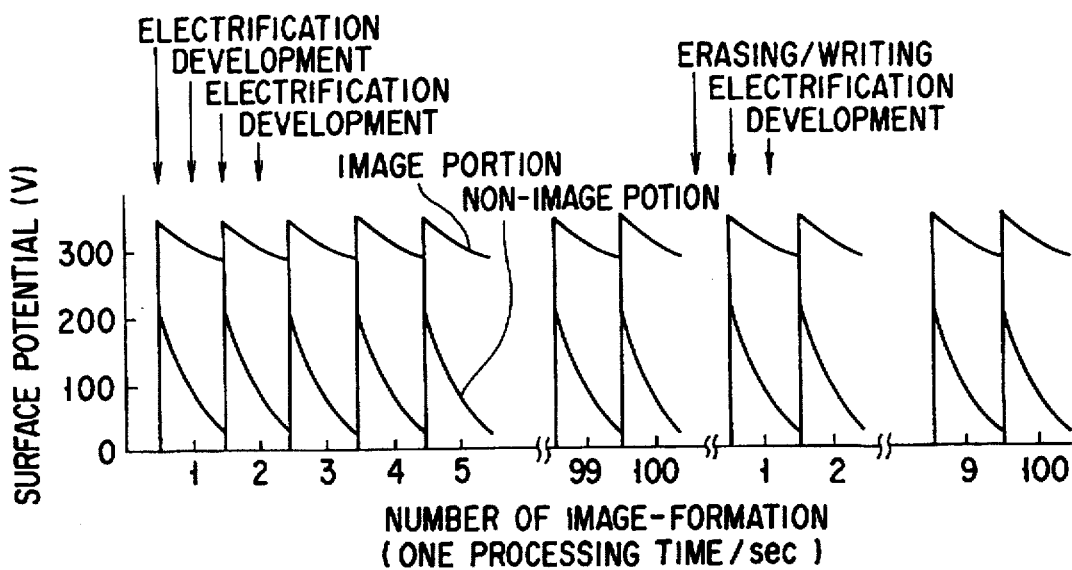
FIG. 11 shows the surface potential of a drift mobility-modulating element of this invention.

Upon the first irradiation of data-erasing light, the data was completely eliminated so that any memory phenomenon was not recognized. FIG. 11 illustrates changes in surface potential between the image portion and and non-image portion when the procedures of electrification, development and transcription were repeated. As will be clear from this FIG. 11, almost same quality of image could be repeatedly obtained.

The quantum efficiency was found to be about 10, thus indicating that this system is suited for repeatedly obtaining an image.

Further, since the resistance differs between the light-irradiated portion and the light-non-irradiated portion, it is possible to generate a change in temperature in correspondence with the kind of a pattern by interposing an electrode between the recording layers and then passing a current. Therefore, if a toner layer is formed thereon in advance, the toner layer could be partially fused for performing a transcription.

(COMPARATIVE EXAMPLE V-1)

A conventional photosensitive body was prepared by using the same charge-transporting molecule as used in Example V-1.

Namely, the same kind of film as employed in the above Example V-1 was used and covered with an aluminum film, and then formed into a cylindrical body.

Subsequently, a charge-generating layer, a blocking layer and an electron-transporting layer were successively laminated around the cylindrical body.

Meanwhile, a mixture comprising 1 part by weight of butyral resin and 1 part by weight of fullerene comprising 80% or more of $C_{70}$ was prepared and then the resultant solution was coated on the outer surface of the cylindrical body and dried to form a charge-generating layer having a thickness of 5 μm (dry). As the blocking layer, an aqueous nylon layer 0.2 μm in thickness was formed. Meanwhile, for the preparation of the charge-transporting layer, 1 part by weight of the same charge-transporting material (c-1) as employed in Example V-1 and 1 part by weight of polycarbonate were mixed together and coated as a solution of 1,1,2-trichloroethane over the blocking layer. As a result, a photosensitive body 20 μm in thickness and comprising a charge-generating layer, a blocking layer and a charge-transporting layer was obtained.

The photo-sensitive body thus prepared was built in an electrophotographic printer of the same type as employed in Example V-1 and, after being electrified, an image was written on this photosensitive body by irradiating a light of 600 nm. Then, the procedures of development and transcription were performed thereby obtaining an image.

Figure 12:
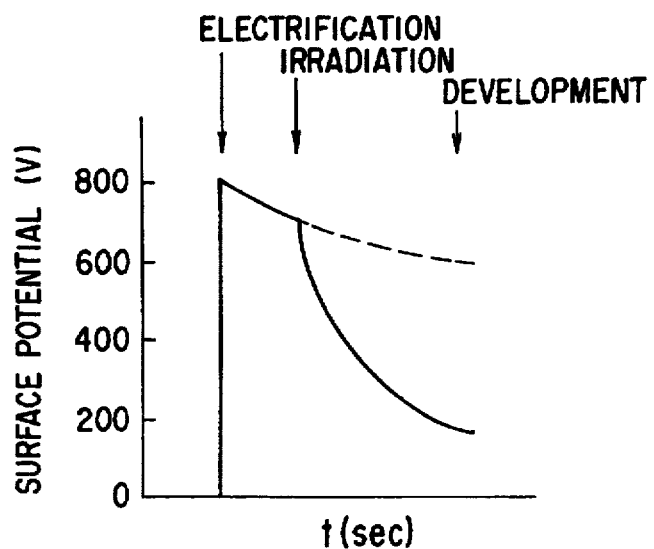
FIG. 12 shows the surface potential of a drift mobility-modulating element of a comparative example.

In the photosensitive body according to this Comparative Example V-1, only one image could be obtained at one time of light exposure in contrast to the photosensitive body according to Example V-1. Therefore, if a large number of images are to be manufactured in this conventional process, a process of electrification, light exposure and development is required to be repeated. FIG. 12 illustrates surface potentials of the image portion and non-image portion when the procedures of electrification, development and transcription were repeated. In this FIG. 12, the solid line represents the surface potential of the non-irradiated portion, while the dotted line represents the surface potential of the irradiated portion.

The quantum efficiency in this case was found to be about 0.2, thus indicating only 1/20 of that obtained in Example V-1.

As explained above, it is possible according to this invention to manufacture a recording element large in recording capacity without requiring an electrode by adopting the measures, wherein an organic molecule and a charge-transporting layer are incorporated into a recording layer and thereby an inner electric field is caused to generate in the recording layer. This recording element is suited for achieving the miniaturizing the recording device and is reloadable. Therefore, this recording element is applicable to the manufacture of an optical file, memory, 3D display, etc. and hence would be industrially very valuable.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A recording element which comprises a recording layer containing:

a first charge-generating material adapted to generate a first electric charge by irradiation with light; a first charge transporting material for transporting said first electric charge; a charge-capturing material for capturing said first electric charge; and material having an electro-optical effect;

wherein said recording element does not comprise means for applying an external electric field.

2. The recording element according to claim 1, wherein a dipole moment of at least one of said materials contained in said recording layer is 3.5 or more.

3. The recording element according to claim 2, wherein the material having a dipole moment of 3.5 or more is said first charge-transporting material.

4. A method of recording information, wherein the recording of information is carried out through a diffraction grating to be formed by irradiating a pair of coherent lights onto the recording element as claimed in claim 1, and wherein no external electric field is applied to said recording layer.

5. A method of recording information in the recording element of claim 1, comprising:

irradiating said charge-generating material so as to generate an electric charge in said recoding element; and diffusing said electric charge whereby said electric charge is captured by said charge-capturing material and an inner electric field is produced between said charge-generating and charge-capturing material;

wherein no external electric field is applied to said recording layer.

6. The method of recording information according to claim 5, wherein the recording of information is carried out through a diffraction grating to be formed by irradiating a pair of coherent lights onto the recording element.

7. The method of recording information according to claim 5, wherein said method further comprises changing the light absorption coefficient of said recording layer.

8. The method of recording information according to claim 5, wherein said method further comprises changing the fluorescence yield of said recording layer.

9. The method of recording information according to claim 5, wherein said method further comprises changing the refractive index of said recording layer.

10. A recording element which comprises a recording layer containing: a compound which can be ionized or has a capability of increasing dipole moment by the application of external energy; a charge-generating material generating an electric charge; a charge-transporting material transporting said electric charge; and a charge-capturing material for capturing said electric charge;

wherein said recording element does not comprise means for applying an external electric field.

11. The recording element according to claim 10, wherein a dipole moment of the charge-transporting material is 3.5 or more.

12. A method of recording information, wherein the recording of information is carried out through a diffraction grating to be formed by irradiating a pair of coherent lights onto the recording element as claimed in claim 10.

13. A drift mobility modulating element which comprises a recording layer containing; a charge-generating material adapted to generate an electric charge by irradiation with light; a charge-capturing material for capturing said electric charge; and a charge transporting material for transporting said electric charge;

wherein a change in conductivity of said recording layer is caused by changing a drift mobility of said charge-transporting material according to an inner electric field to be generated by delivery of electric charge between said charge-generating material generating electric charge and said charge-capturing material capturing said electric charge; and wherein said drift mobility modulating element does not comprise means for applying an external electric field.

14. A method of recording information, wherein the recording of information is carried out through a diffraction grating to be formed by irradiating a pair of coherent lights onto the drift mobility-modulating element as claimed in claim 13.

15. A recording element which comprises a recording layer containing; a first charge-generating material adapted to generate a first electric charge by irradiation with light; a first charge-transporting material for transporting said first electric charge; a charge-capturing material for capturing said first electric charge; and a material having an electro-optical effect;

wherein said recording element does not comprise means for applying an external electric field, and a dipole moment of at least one of said materials is 3.5 debye or more.

16. A recording element which comprises a recording layer containing; a first charge-generating material adapted to generate a first electric charge by irradiation with light; a second charge-generating material adapted to generate a second electric charge having an opposite polarity from that of said first electric charge; a first charge transporting material for transporting said first electric charge; a charge-capturing material for capturing said first electric charge; and material having an electro-optical effect;

wherein said recording element does not comprise means for applying an external electric field.

17. The recording element according to claim 16, wherein an ionization potential and electron affinity of each components meet the following equations:

$$Ip(g) > Ip(ct) > Ip(tr)$$

$$X(tr) > X(e)$$

wherein Ip(g) represents an ionization potential of the first charge-generating material, Ip(ct) represents an ionization potential of the first charge-transporting material, Ip(tr) represents an ionization potential of the charge-capturing material, X(tr) represents an electron affinity of charge-capturing material and X(e) represents an electron affinity of the second charge-generating material.

18. The recording element according to claim 16, wherein an ionization potential and electron affinity of each components meet the following equations:

$$Ip(g) > Ip(ct) - \sigma(ct) > Ip(tr) + \sigma(tr)$$

$$X(tr) > X(e)$$

wherein Ip(g) represents an ionization potential of the first charge-generating material, Ip(ct) represents an ionization potential of the first charge-transporting material, Ip(tr) represents an ionization potential of the charge-capturing material, σ(ct) represents an energy distribution width of the first charge-transporting material, σ(tr) represents an energy distribution width of the charge-capturing material, X(tr) represents an electron affinity of charge-capturing material and X(e) represents an electron affinity of the second charge-generating material.

19. The recording element according to claim 16, which further comprises a second charge-transporting material which is adapted to transport said second electric charge.

20. The recording element according to claim 19, wherein an ionization potential and electron affinity of each components meet the following equations:

$$Ip(g) > Ip(ct) > Ip(tr)$$

$$X(tr) > X(rt) > X(e)$$

wherein Ip(g) represents an ionization potential of the first charge-generating material, Ip(ct) represents an ionization potential of the second charge-transporting material, Ip(tr) represents an ionization potential of the charge-capturing material, X(tr) represents an electron affinity of charge-capturing material, X(rt) represents an electron affinity of the second charge-transporting material and X(e) represents an electron affinity of the second charge-generating material.

21. A method of recording information, wherein the recording of information is carried out through a diffraction grating to be formed by irradiating a pair of coherent lights onto the recording element, wherein said recording element comprises:

a recording layer comprising; a first charge-generating material adapted to generate a first electric charge by irradiation with light; a second charge-generating material adapted to generate a second electric charge having an opposite polarity from that of said first electric charge; a first charge transporting material for transporting said first electric charge; a charge-capturing material for capturing said first electric charge; and material having an electro-optical effect;

wherein no external electric field is applied to said recording layer.

22. A method of erasing information, wherein the erasing of information is carried out through an elimination of a diffraction grating that can be effected by irradiating light onto the recording element, wherein said recording element comprises:

a recording layer comprising; a first charge-generating material adapted to generate a first electric charge by irradiation with light; a second charge-generating material adapted to generate a second electric charge having an opposite polarity from that of said first electric charge; a first charge transporting material for transporting said first electric charge; a charge-capturing material for capturing said first electric charge; and material having an electro-optical effect;

wherein no external electric field is applied to said recording layer.

* * * * *